US008620721B1

(12) United States Patent
Breiter

(10) Patent No.: US 8,620,721 B1
(45) Date of Patent: *Dec. 31, 2013

(54) SYSTEM AND METHOD FOR DETERMINING RELATIVE PREFERENCES FOR MARKETING, FINANCIAL, INTERNET, AND OTHER COMMERCIAL APPLICATIONS

(75) Inventor: Hans C. Breiter, Lincoln, MA (US)

(73) Assignee: Wahrheit, LLC, Lincoln, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,155

(22) Filed: Aug. 13, 2012

Related U.S. Application Data

(63) Continuation of application No. 12/172,914, filed on Jul. 14, 2008, now Pat. No. 8,255,267.

(60) Provisional application No. 60/959,352, filed on Jul. 13, 2007, provisional application No. 60/959,406, filed on Jul. 13, 2007.

(51) Int. Cl.
G06Q 10/00 (2012.01)

(52) U.S. Cl.
USPC ..... 705/7.32; 705/7.29; 705/7.33; 705/14.42; 705/14.44

(58) Field of Classification Search
USPC ............................................... 705/7.11–7.42
See application file for complete search history.

(56) References Cited

U.S. PATENT DOCUMENTS

| 7,860,741 B1 | 12/2010 | Robinson | |
|---|---|---|---|
| 2001/0032107 A1 | 10/2001 | Iwata et al. | |
| 2002/0165859 A1 | 11/2002 | Iyengar et al. | |
| 2003/0165269 A1 | 9/2003 | Fedorovskaya et al. | |
| 2004/0111314 A1* | 6/2004 | Cavaretta | 705/10 |
| 2004/0204983 A1* | 10/2004 | Shen et al. | 705/10 |
| 2005/0060222 A1 | 3/2005 | White | |
| 2006/0010029 A1* | 1/2006 | Gross | 705/10 |
| 2007/0005425 A1* | 1/2007 | Bennett et al. | 705/14 |
| 2008/0243638 A1 | 10/2008 | Chan et al. | |

FOREIGN PATENT DOCUMENTS

RU 2210107 C1 8/2003

OTHER PUBLICATIONS

Shannon, C. E., "A Mathematical Theory of Communication," The Bell System Technical Journal, vol. 27, p. 379-423, 623-656, Jul. Oct. 1948, pp. 1-55.

(Continued)

Primary Examiner — David Rines
(74) Attorney, Agent, or Firm — Cesari and McKenna, LLP; Michael R. Reinemann

(57) ABSTRACT

A method analyzes preferences of one or more participants. Each of the participants may be presented with a plurality of evaluation items that illustrate various marketing options. Response data from the participants that indicates at least an approach, if any, toward the evaluation items is obtained. An approach entropy value may be generated for the marketing options based on the response data for each participant. A relative preference order for each participant for the marketing options may be determined from the generated approach entropy values.

21 Claims, 15 Drawing Sheets

(56) References Cited

OTHER PUBLICATIONS

"Notification of Transmittal of the International Search Report and the Written Opinion of the International Searching Authority, or the Declaration," International Filing Date: Jul. 14, 2008, International Application No. PCT/US2008/08584, Applicant: Wahrheit, LLC., Date of Mailing: Mar. 27, 2009, pp. 1-8.

Aharon, Itzhak, et al., "Beautiful Faces Have Variable Reward Value: fMRI and Behavioral Evidence," Neuron, vol. 32, Cell Press, Nov. 8, 2001. pp. 537-551.

Strauss, M. M., et al., "fMRI of Sensitization to Angry Faces," NeuroImage, NeuroImage 26 (2005), Elsevier Inc., 2005, pp. 389-413.

"Notification of Transmittal of the International Search Report and the Written Opinion of the International Searching Authority, or the Declaration," International Filing Date: May 23, 2012, International Application No. PCT/US2012/000251, Applicant: Wahrheit, LLC, Date of Mailing: Aug. 29, 2013, pp. 1-8.

* cited by examiner

SYSTEM AND METHOD FOR DETERMINING RELATIVE PREFERENCES FOR MARKETING, FINANCIAL, INTERNET, AND OTHER COMMERCIAL APPLICATIONS

CROSS-REFERENCE TO RELATED APPLICATIONS

This application is a continuation of application Ser. No. 12/172,914, filed Jul. 14, 2008, for a SYSTEM AND METHOD FOR DETERMINING RELATIVE PREFERENCES FOR MARKETING, FINANCIAL, INTERNET, AND OTHER COMMERCIAL APPLICATIONS, now U.S. Pat. No. 8,255,267, which claims the benefit of U.S. Provisional Application Ser. No. 60/959,352, filed Jul. 13, 2007 for a SYSTEM AND METHOD FOR APPLYING PREFERENCE DYNAMICS TO MARKETING, FINANCIAL, COMMERCIAL, HUMAN RESOURCES, ECONOMICS, INTERNET PROCESSES, AND OTHER APPLICATIONS, and U.S. Provisional Application Ser. No. 60/959,406, filed Jul. 13, 2007 for a SYSTEM AND METHOD FOR APPLYING PREFERENCE DYNAMICS TO SECURITY AND OTHER USES, which applications are hereby incorporated by reference in their entireties.

BACKGROUND OF THE INVENTION

1. Field of the Invention

The present invention relates to systems and methods for determining preferences with regard to marketing and other stimuli.

2. Background Information

In developing or selecting a new product or service, a company, such as a consumer product company, typically undertakes a number of market research studies to evaluate the new product or service. These studies may include surveys, interviews and focus groups. Focus groups are often used to acquire feedback and other information regarding new products or services. Focus groups allow the consumer product company to test the new product and make changes before it is made available to the public. The feedback and other information generated by the focus group provide insight into the potential acceptance of the new products or services in the marketplace. Despite their use, focus groups have been subject to criticism. In particular, it has been noted that members of focus groups often try to please the moderator rather than offer independent opinions or evaluations. In addition, the feedback and other information can be misinterpreted.

In addition to market research studies, new tools related to neuromarketing have been used to study consumer's sensorimotor, cognitive, and affective response to marketing stimuli. With neuromarketing, researchers use diagnostic or other equipment, such as functional magnetic resonance imaging (fMRI) to measure changes in activity in parts of the consumer's brain, and sensors to measure changes in a consumer's physiological state, such as heart rate, respiratory rate, etc., in an effort to learn why consumers make particular decisions. Although, the brain does not "lie", measures made from the brain depend on very sophisticated technology, and cannot be readily implemented on the Internet. Furthermore, neuromarketing approaches have yet to find any recurrent, robust, and scalable law-like patterns to human judgment and decision-making (i.e., choice behavior). Absent applications based on such recurrent, robust, and scalable law-like patterns based on behavior, physiological, or neural signals, neuromarketing approaches, and traditional approaches based on focus groups, cannot accurately and objectively map out the space of human preference.

SUMMARY OF THE INVENTION

In an embodiment, a method analyzes preferences of participants. Each participant may be presented with a plurality of evaluation items that illustrate various marketing options. Response data from the participants that indicates at least an approach, if any, toward the evaluation items is obtained. An approach entropy value is generated and stored for the marketing options based on the response data for each participant. A relative preference order for each participant of the marketing options may be determined from the generated approach entropy values graphed against the mean intensity of these responses.

In another embodiment, a computer-readable medium includes instructions executable by a data processing entity. The medium includes instructions to present to one or more participants a plurality of evaluation items that illustrate various marketing options. The medium further includes instructions to obtain response data from the participants that is indicative of an approach toward the evaluation items and an avoidance of the evaluation items. The medium also includes instructions to generate for each participant an approach entropy value and/or an avoid entropy value for the marketing options based on the response data. The medium further includes instructions to display, or print or otherwise record and/or present a plot of the approach entropy values for the marketing options as a function of the avoid entropy values for the marketing options. The medium may further include instructions to display or print for the individual, and for the group of participants, graphs of approach and avoid entropy values, graphs of mean response intensity versus approach/avoid entropy values, graphs of mean response intensity versus standard deviation, and graphs of other relevant location plus dispersion estimates.

In another embodiment, a method analyzes preferences of participants. Each participant may be presented with a plurality of evaluation items that illustrate various marketing options. Response data from the participants that indicates at least an approach and/or avoidance toward the evaluation items by the participants is obtained. An approach and/or avoid standard deviation value is generated and stored for the marketing options based on the obtained response data. A plot of the approach standard deviation values for the marketing options as a function of the response data indicative of at least the approach toward the evaluation items is displayed, printed or otherwise recorded and/or presented. A plot of the avoid standard deviation values for the marketing options as a function of the response data indicative of at least the avoidance toward evaluation items may be displayed or printed. An indication of the ease or difficulty in deciding to approach the marketing options is determined based on the plot, and may be used to determine the effectiveness of the marketing options.

BRIEF DESCRIPTION OF THE DRAWINGS

The invention description below refers to the accompanying drawings, of which.

DETAILED DESCRIPTION OF AN ILLUSTRATIVE EMBODIMENT

Overview

Figure 1:
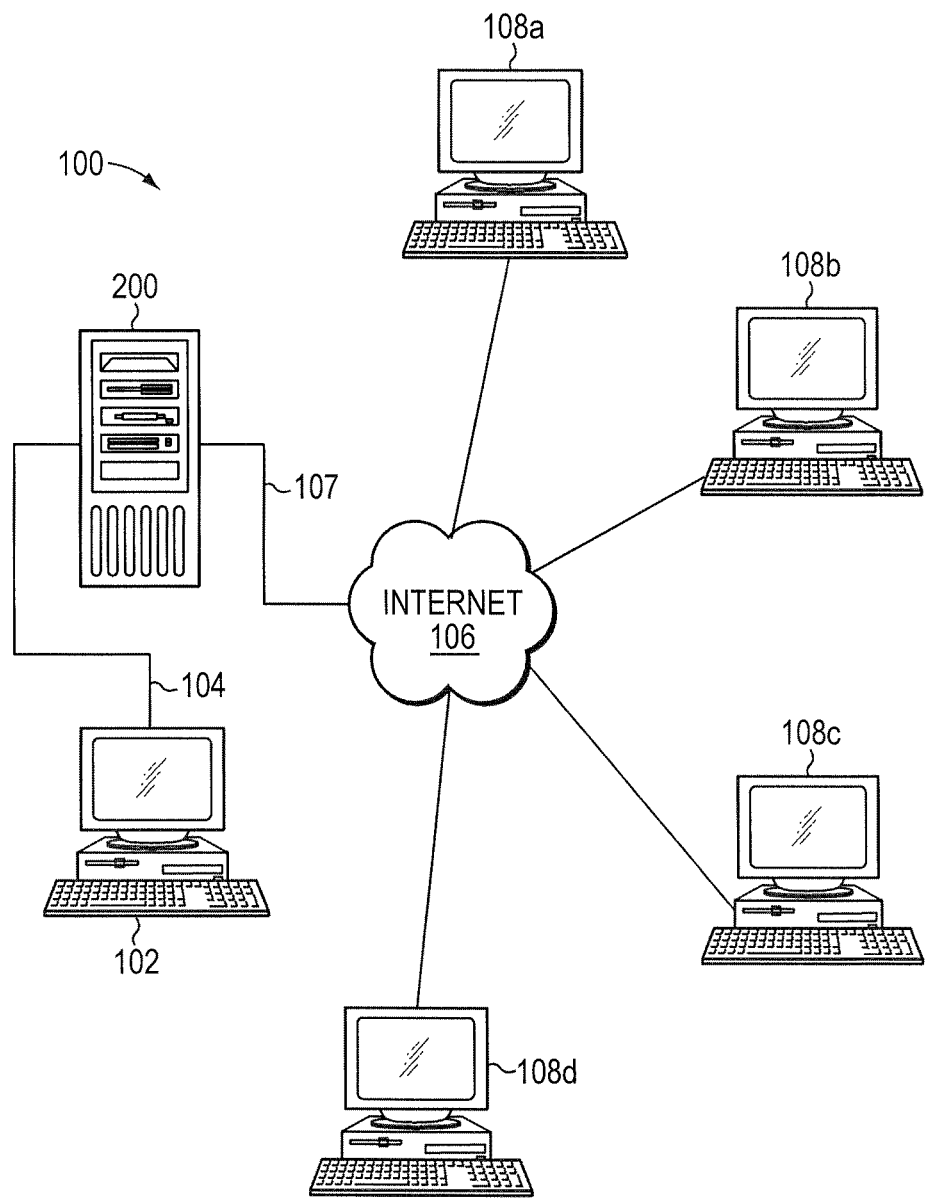
FIG. 1 is a schematic illustration of a system in accordance with an embodiment of the invention.

As described herein, relative preferences can be assessed by keypress procedures that quantify (i) decision-making regarding approach, avoidance, indifference, and uncertain/inconsistent responses, and (ii) judgments that determine the magnitude of approach and avoidance. Over the course of multiple experiments, the inventor evaluated whether splitting ratings of preference into explicit measures of approach and avoidance (while viewing beautiful and average faces, or distinct categories of facial expression, or distinct categories of physical activity, or food while the viewer is in different hedonic deficit states) reveals any regular patterns in behavior, such as a trade-off in approach and avoidance, or recurrent lawful patterns as observed with Kahneman and Tversky's prospect theory, or the Herrnstein-Baum matching law. Patterns for approach and avoidance were discovered by the inventor that are (i) recurrent across all stimulus types, and (ii) robust to noise. These patterns included: (a) a preference trade-off that counterbalances approach and avoidance responses, (b) a value function linking preference intensity to uncertainty about preference, and (c) a saturation function linking preference intensity to its standard deviation. All patterns demonstrated symmetry between group and individual data. In addition, the keypress-based value function had the same mathematical structure as the value function in prospect theory, and was consistent with the matching law for individual data. The inventor further evaluated the specificity of these patterns to gender biases and clinical abnormalities. These patterns verified known biases between females and males toward beautiful and average faces. When used to evaluate cocaine dependent subjects versus healthy controls, these patterns quantified the phenotype of the restricted behavioral repertoire associated with addiction. In general, these patterns provided a basis for mapping the space of relative preference in groups or individuals, leading to the current application of the uses of these recurrent, robust, and scalable patterns in relative preference for commercial applications.

In accordance with the present invention, the underlying data (keypresses) is transformed in accordance with one or more defined mathematical procedures for presentation to the analyst who will make decisions based on the transformed data. As discussed in detail below, these procedures include, but are not limited to, a Shannon Entropy transformation, a Value Function transformation, and a Saturation transformation. I have found that, over a wide range of subjects and tests, the responses of test subjects strongly tend to cluster along functional data paths defined by these transformations, reflecting an underlying pattern of human behavior and choices that is not readily observable when the data is presented in raw format (e.g., simple tabulations of key presses). This enables the analyst to more readily and confidently assess the responses and quickly differentiate the more desirable from the lesser. It also enables the analyst to quickly recognize responses that deviate substantially from the established patterns and thus are to be considered suspect.

Relative Preference System

FIG. 1 is a schematic illustration of a relative preference system 100 in accordance with an embodiment of the invention. The system 100 includes a relative preference server 200 coupled to a management console 102 via a communication link 104. Server 200 is also coupled to a data communication network, such as the Internet, as illustrated by Internet cloud 106, via a communication link 107. Coupled to, or part of, the Internet 106 are a plurality of participant consoles, such as consoles 108a-d. Server 200, management console 102 and participant consoles 108a-d may communicate by exchanging discrete packets or frames through the data communication network according to predefined communication protocols, such as the Transmission Control Protocol/Internet Protocol (TCP/IP) or the Internetwork Packet eXchange (IPX) protocol, among others.

In an embodiment, the management console 102 and the participant consoles 108 are each computers, such as workstations, desktops, notebooks, laptops, palm-tops, smart phones, personal digital assistants (PDAs), etc. Accordingly, the management console 102 and the participant consoles 108 each include one or more input devices, such as a keyboard, mouse, microphone, etc., one or more output devices, such as a display, speakers, etc., and communication facilities. Suitable computers for use as the management console 104 and the participant consoles 108 include the HP Pavilion series of computers from Hewlett Packard Co. of Palo Alto, Calif., the Inspiron series of computers from Dell Inc. of Round Rock, Tex., and the MacBook series of computers from Apple, Inc. of Cupertino, Calif. Those skilled in the art will recognize that other computer platforms may be advantageously utilized with the present invention.

It should be understood that in other embodiments, one or more or even all of the participant consoles 108 may be directly connected to the relative preference server 200.

Relative Preference Server

Figure 2:
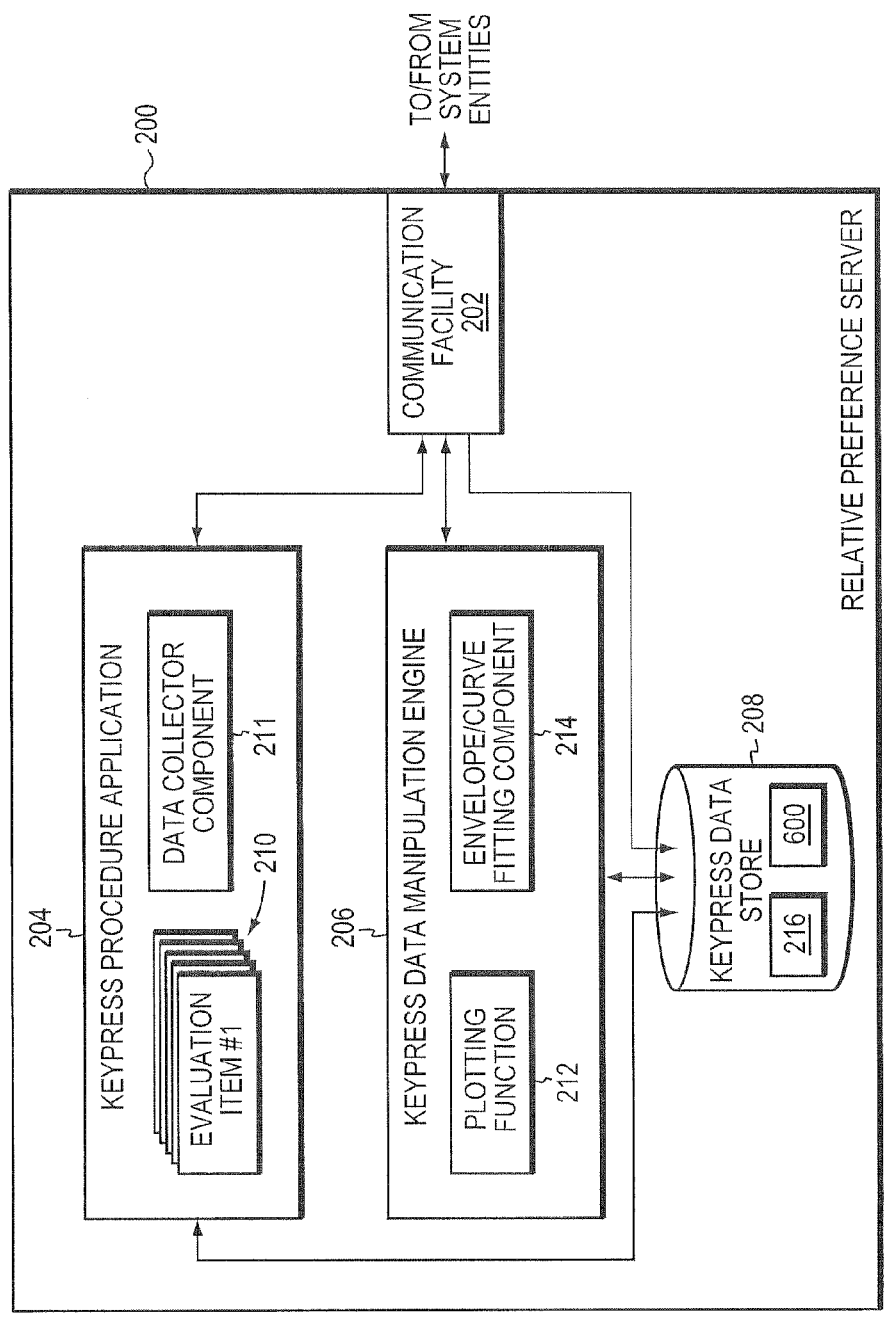
FIG. 2 is functional diagram of a relative preference server.

FIG. 2 is a schematic illustration of the relative preference server 200. Server 200 includes a communication facility 202, at least one keypress procedure application 204, a keypress data manipulation engine 206, and a keypress data store 208. The keypress procedure application 204, the keypress data manipulation engine 206, and the keypress data store 208 are each coupled to the communication facility 202. The keypress procedure application 204 may include a plurality of evaluation items, such as evaluation item no. 1, evaluation item no. 2, etc., designated generally 210. The keypress procedure application 204 may also include a data collector component 211. The keypress data manipulation engine 206 may include one or more plotting functions, such as plotting function 212, and one or more envelope/curve fitting components, such as envelope/curve fitting component 214. The keypress data store 208 may include a plurality of response data records, such as record 600, and a plurality of relative preference data records, such as record 216.

The communication facility 202 may include one or more software libraries for implementing a communication protocol stack allowing server 200 to exchange messages with other entities of the system 100 (FIG. 1), such as the management console 102 and the participant consoles 108a-d. The communication facility 202 may, for example, include software layers corresponding to the Transmission Control Protocol/Internet Protocol (TCP/IP), although other communication protocols, such as Asynchronous Transfer Mode (ATM) cells, the Internet Packet Exchange (IPX) protocol, the AppleTalk protocol, the DECNet protocol and/or NetBIOS Extended User Interface (NetBEUI), among others, could be utilized. Communication facility 202 further includes transmitting and receiving circuitry and components, including one or more network interface cards (NICs) that establish one or more ports, such as wired or wireless ports, for exchanging data packets and frames with other entities of the system 100.

Server 200 may be a computer server having one or more processors, such as a central processing unit (CPU), and memories, such as a hard disk drive, interconnected by a system bus. Suitable servers for use with the invention include the HP ProLiant series of servers from Hewlett Packard Co., the PowerEdge series of servers from Dell Inc., and the IBM Blade Center series of servers from International Business Machines Corp. of Armonk, N.Y., among others.

It should be understood that one or more of the components of the relative preference server 200 may alternatively or additionally be included within the management console 102. For example, each of the components of the relative preference server 200 may be included in the management console 102, thereby eliminating the need for a separate server 200.

The keypress procedure application 204 and the keypress data manipulation engine 212 may include or comprise programmed or programmable processing elements containing program instructions, such as software programs, modules, or libraries, pertaining to the methods and functions described herein, and executable by the processing elements. Other computer readable media may also be used to store and execute the program instructions. The keypress procedure application 204 and the keypress data manipulation engine 212 may also be implemented in hardware through a plurality of registers and combinational logic configured to produce sequential logic circuits and cooperating state machines. Those skilled in the art will recognize that various combinations of hardware and software components, including firmware, also may be utilized to implement the invention.

The keypress data store 208 may be implemented on a hard disk drive, a redundant array of independent disks (RAID), a flash memory, or other memory.

Marketing Options

Figure 3:
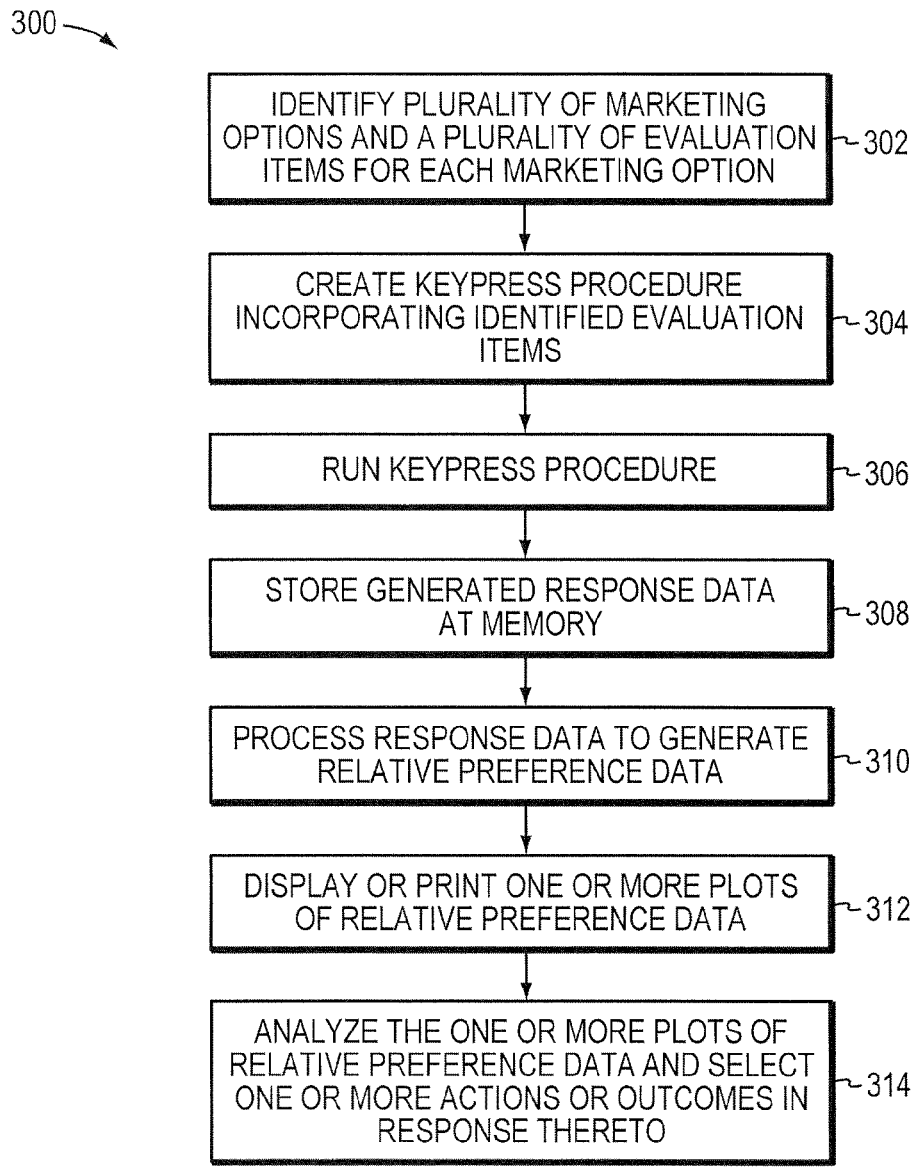
FIGS. 3 and 7 are flow diagrams of preferred methods in accordance with embodiments of the invention.

FIG. 3 is a flow diagram of a method 300 according to an embodiment of the invention. A developer identifies a set of marketing options (experimental conditions) to be tested or evaluated, and creates or defines a corresponding set of evaluation items (stimuli) for each of the marketing options, as indicated at block 302. Each evaluation item may illustrate a different view or use of the marketing option. In an embodiment, a set of marketing options may be proposed for existing products, packaging, or services, or advertising or marketing campaigns, etc. Those skilled in the art will recognize that other marketing options may be used, such as items in an inventory.

For example, suppose a consumer product company has developed five new proposed products or packaging, such as new razor blades, new packaging alternatives for shampoo, new soft drinks, new containers for a soft drink, etc., and is trying to choose which of the new proposed products or packaging designs to release to the marketplace. Each of these five proposed products or packaging designs represents a marketing option. For each marketing option, the developer creates or defines a set of evaluation items that can be sensed or perceived, e.g., visually, aurally, tactilely or through taste or smell, or some combination thereof, by participants. For example, for the proposed razor blades or the proposed soft drink containers, the set of evaluation items may be a series of photographs or video clips of each proposed razor blade or soft drink container. That is, for proposed razor blade no. 1, the developer may define or create 20 different photos of razor blade no. 1, such as the razor blade itself, someone using the razor blade, etc. For proposed razor blade no. 2, the developer may define or create 20 different photos of razor blade no. 2, and so on, so that for each marketing option there is a set of evaluation items. In an embodiment, each evaluation item illustrates only one marketing option.

It should be understood that the evaluation items may take other forms besides photographs or video clips. For example, if the marketing options for which relative preferences data is being sought are songs, then the evaluation items may be different excerpts from the songs that can be played through the speakers of the participant consoles 108. If the marketing options are perfumes or other scented products, the evaluation items may be samples of the perfumes or scents that the participant can smell.

Keypress Procedure

The developer next develops a keypress procedure incorporating the sets of evaluation items for the marketing options, as indicated at block 304. In an embodiment, a suitable keypress procedure is implemented through a computer program or application that displays the photographs or video clips to each participant, and allows the participant to either extend or shorten the time that a given photograph or video clip is displayed by entering keypresses on a keyboard at the participant console. The term "keypress procedure" is intended to broadly define any procedure in which preference based response data is generated by participants in response to being presented with evaluation items. As described herein, other response data besides keypress data may be generated by the participants and utilized by the system and method of the invention.

Figure 4:
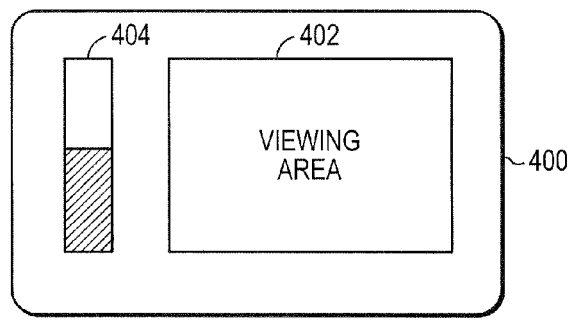
FIG. 4 is an illustration of a display screen used in the collection of response data.
Figure 5:
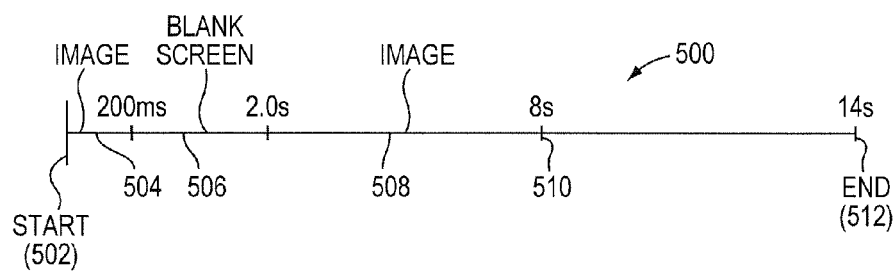
FIGS. 5 and 22 are illustrations of timelines for the presentation of evaluation items.

FIG. 4 is a schematic illustration of a screen 400 of a participant console 108 (FIG. 1) displaying the visible portions of a keypress procedure presented to a participant, and FIG. 5 is a timeline 500 of a keypress procedure. The screen 400 includes a viewing area 402 in which the current evaluation item, e.g., the current photograph or video clip, is presented or displayed. The screen 400 also may include a time remaining icon 404, which provides a visual indication to the participant of how much longer the currently presented evaluation item, e.g., photograph or video clip, will continue to be displayed. With reference to the timeline 500, the portion of the keypress procedure associated with each evaluation item, e.g., each given photograph or video clip, has a start time 502. In a first phase 504, the current evaluation item, e.g., the current photograph or video clip, may be displayed in viewing area 402 (FIG. 4) for approximately 200 milliseconds (ms). In a second phase 506, the current evaluation item, e.g., the current photograph or video clip, is removed from the viewing area 402 leaving the viewing area blank for approximately 1.8 seconds (s). In a third phase 508, the current evaluation item, e.g., the current photograph or video clip, is once again displayed in the viewing area 402.

During the third phase 508, the participant can act to either lengthen or shorten the time that the current evaluation item, e.g., the current photograph or video clip, continues to be displayed in the viewing area 402. If the participant takes no action, the current evaluation item, e.g., the current photograph or video clip, is removed or stopped at a default time 510, which may be eight seconds, and the keypress procedure proceeds to the next evaluation item, e.g., the next photograph or video clip. If the participant finds the current evaluation item to be desirable or appealing, the participant may lengthen the time by which it remains displayed past the default time 510 by alternatingly pressing two keys on the keyboard of the participant console, referred to as the "approach" keys, such as the keys corresponding to the numbers 7 and 9, in a toggle-like fashion. By continuing to toggle between the two approach keys, the participant can cause the current evaluation item, e.g., the current photograph or video clip, to continue to be displayed up to a maximum time 512, e.g., fourteen seconds, thereby signaling both a preference toward the current evaluation item and the intensity of the participant's preference toward the current evaluation item.

If the participant dislikes the current evaluation item, the participant may shorten the time during which it is displayed by alternatingly pressing two other keys of the keyboard, referred to as the "avoidance" keys, such as the keys corresponding to the numbers 1 and 3, in a toggle-like fashion. By continuing to toggle between the two avoid keys, the participant can stop the display of the current evaluation item, e.g., the current photograph or video clip, sooner than the default time 510, thereby signaling both a dislike of the current evaluation item and the intensity of the participant's dislike toward the current evaluation item.

It should be understood that a participant may utilize both the approach keys and the avoid keys to variable degrees in an alternating fashion, while being presented with an evaluation item, e.g., while viewing a given photograph or video clip, thereby signaling both preference and dislike, e.g., uncertainty, regarding the current evaluation item.

Thus, the response data generated by a participant may indicate indifference or ambivalence toward the evaluation item (no action by the participant), a preference toward the evaluation item (toggling of just the approach keys), an avoidance of the evaluation item (toggling of just the avoid keys), or uncertainty/inconsistency in preference regarding the evaluation item (toggling both the approach and the avoid keys).

The time remaining icon 404 indicates how much longer the current evaluation item, e.g., the current photograph or video clip, will be displayed. The time remaining icon 404 may be a stack of thin horizontal lines that may be on, e.g., colored green, or off, similar to a graphic volume indicator. Those skilled in the art will understand that other graphical elements or widgets may be used. If the participant takes no action, the time remaining icon 404 begins dropping at the start of the third phase 508 and is completely empty at the default time 510, at which point the current evaluation item, e.g., the current photograph or video clip, is removed from the viewing area 402, and the keypress procedure application 204 proceeds with the next evaluation item, e.g., the next photograph or video clip. If the participant toggles the approach keys, then the time remaining icon 404 drops at a slower rate and may not reach an empty point until sometime after the default time 510 up to a maximum at the end time 512, depending on how many times and/or how quickly the participant presses the approach keys. If the participant toggles the avoid keys, then the time remaining icon 404 drops at a fast rate and may reach an empty point before the default time 510, depending on how many times and/or how quickly the participant presses the avoid keys.

In an embodiment, the keypress procedure presents each evaluation item, e.g., each photograph or video clip, to the participant according to the above-described process, as illustrated by the timeline 500. In another embodiment, there may be a maximum total test time for the entire keypress procedure. If a participant reaches this maximum total test time before viewing all of the evaluation items, the keypress procedure ends and the participant is not presented with or exposed to the remaining evaluation items.

In an embodiment, each marketing option or experimental condition has eight or more evaluation items, and may have on the order of twenty or more evaluation items. Nonetheless, those skilled in the art will understand that other numbers of marketing options and/or evaluation items may be used. For example, a keypress procedure having on the order of twenty marketing options or experimental conditions each having three evaluation items may be created.

The developer in addition to selecting the evaluation items also determines the sequence or order in which the evaluation items are presented to each participant. In an embodiment, the evaluation items of the various marketing options are interspersed following conservative experimental psychology procedures so that one experimental stimulus or response does not overweight the effects of others. This may be done by counterbalancing all categories of items, one item forward and one item backward in a sequence of such items. It may also be performed by pseudo-random intermixture of experimental stimuli with jitter of the inter-stimulus intervals so that the items, modeled by a hemodynamic waveform (as may be done for single-trial functional magnetic resonance imaging studies), produce minimal carryover effects by simulation.

Suitable keypress procedures are also described in I. Aharon et al. *Beautiful Faces Have Variable Reward Value: fMRI and Behavioral Evidence*, Neuron Vol. 32, pp. 537-551 (November 2001), and M. Strauss et al. *fMRI of Sensitization to Angry Faces*, Neuroimage, pp. 389-413 (April 2005), which are hereby incorporated by reference in their entireties.

It should be understood that the keypress procedure does not have be a toggle-like pressing of two keys by two fingers. For example, the procedure could involve a series of mouse clicks, a triple button press activated by three fingers in a row, a repetitive typewriter keystroke, etc.

It should further be understood, as indicated above, that other techniques or procedures may be used instead of a keypress procedure. Other such procedures may involve a lever press, a potentiometer, an on/off switch, or a touch screen element, among others.

With the lever-press procedure, the whole hand or a finger or foot or eye saccade or other motor output of the participant may be used to repetitively signal his or her preference toward approaching, avoiding, doing nothing about, or variably approaching/avoiding the evaluation item or stimulus. Such a procedure may be advantageous for participants whose fine-motor coordination is not well developed, or where physical constraints are imposed by the data collection process, the environment, or the personal medical condition of the participant.

The potentiometer procedure may be implemented using a button that the participant twists, e.g., to move a cursor on the screen in order to set the cursor at a level of the experience or effort that the participant is willing to expend. Alternatively, it may be implemented as the scrolling of a mouse, or as a lever or joystick that the participant pushes in any of N directions to signal N types of action. It may also be implemented with a device to scroll the participant's response as represented by an increasing or decreasing bar on the side of the screen.

The on/off switch procedure may advantageously be used with sound based evaluation items or stimuli, such as songs, or with any temporally extended type of stimuli, in which an evaluation item starts for a set amount of time, and the participant can terminate the exposure at any time, or repeat it. For example, the participant can start and stop the evaluation item, e.g., a song, a picture, a scent or odor, a physical sensation, etc., at any time with one type of signal, or that will stop on its own when it reaches a pre-determined exposure time or "default time", unless the participant produces another type of signal so that the evaluation item continues on for another pre-determined window of time. With enough repetitions of the repeat signal, the evaluation item, e.g., song or film, may be heard or viewed by the participant.

The response data of the on/off switch procedure may be a view time or exposure time for each evaluation item. This response data may be partitioned as "avoidance" if it is below a mean view time for the group of participants, or as "approach" if it is above the mean view time. Alternately, the view time or exposure time response data may be used to produce a positive value function plot and saturation plot alone from analyses.

As described, a suitable procedure may permit a participant to control the amount of his or her exposure to a visual, auditory, somatosensory, gustatory, olfactory, vestibular, or other stimulus or evaluation item. Each procedure involves some way to transcribe physical effort (involving energy expenditure by the participant) into time of exposure.

In another embodiment, the procedure also may be used to signal how much money a participant would spend to approach, avoid, do nothing about, or variably approach/avoid an evaluation item or stimulus. Alternately, a "keypress" procedure may be used to signal a transaction using some measure other than money, such as points, or any item of commercial value that could be used for barter.

Those skilled in the art will understand that other procedures may be used or that modifications to the procedures described herein may be made.

Keypress Data Collection

A plurality of participants run the keypress procedure, as indicated at block 306 (FIG. 3). In an embodiment, the keypress procedure application 204 including the evaluation items is stored at and accessible from the relative preference server 200 (FIG. 1). A participant located at a respective participant console, e.g., console 108a, accesses the keypress procedure application 204 from the server 200, utilizing the data communication network, e.g., the Internet 106. For example, the participant may access the keypress procedure application 204 and run the keypress procedure through a World Wide Web (WWW) web site hosted by the server 200. The participant may be given a login identity (ID) that is unique to the particular participant, and a password to access the keypress procedure application 204 and run the keypress procedure, or they may not need login and password procedures.

It should be understood that the participant may be provided with instructions on how to run the keypress procedure.

It should be further understood that each participant may provide demographic information about himself or herself, such as age, sex, marital status, employment status, income, education level, buying habits, computer Internet Protocol (IP) address, race, languages spoken, etc.

In an embodiment, a participant may download a keypress procedure from server 200, run it on his or her console 108, and transmit response data, e.g., by e-mail, to server 200. Those skilled in the art will recognize that other ways of accessing and running a keypress procedure and collecting response data may be used.

Response data generated during each participant's running of the keypress procedure is captured and stored, as indicated at block 310. The data collector component 211 of the keypress procedure application 204 captures and stores the response data, which may include the total time that each evaluation item is maintained, e.g., viewed for photographs or video clips, by the participant, the number of approach keypresses and the number of avoid keypresses. The data collector 211 may organize the response data into records, and store the records at the keypress data store 208.

Figure 6:
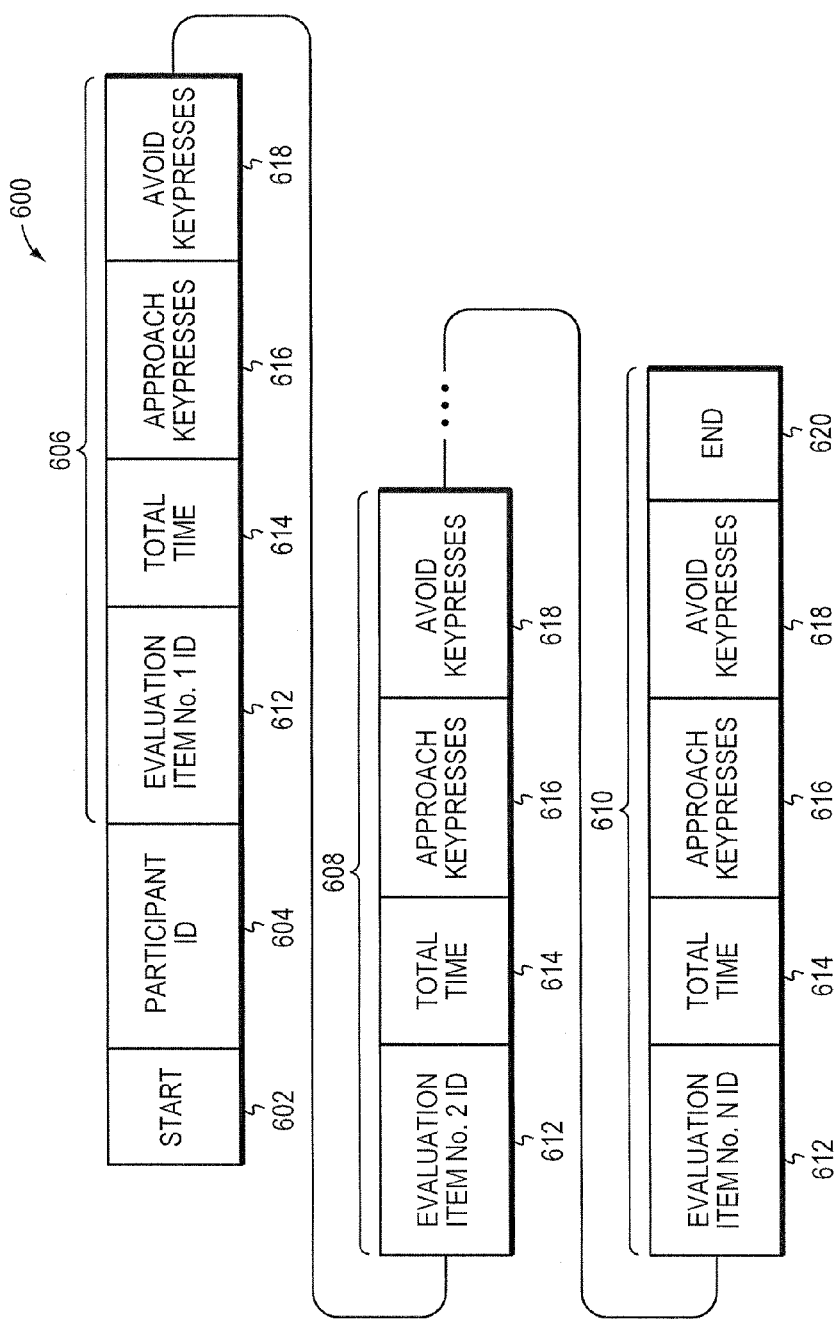
FIG. 6 is a schematic illustration of a data record.

FIG. 6 is a schematic illustration of a response data record 600 for a given participant. The data record 600 is organized into a plurality of fields, including a start field 602, a participant ID field 604, and a evaluation item area for each evaluation item in the keypress procedure, such as evaluation item areas 606, 608 and 610, which correspond to evaluation items 1, 2 and N. The participant ID field may store the participant's name or login ID. Each evaluation item area, moreover, may include a item ID field 612 that identifies the particular evaluation item, a total time field 614 that holds the total time that the respective evaluation item was viewed by the participant, an approach keypresses field 616 that stores the number of approach keypresses entered by the participant for that evaluation item, and an avoid keypresses field 618 that stores the number of avoid keypresses entered by the participant for that evaluation item. The data record 600 may also include an end field 620. For each participant running the keypress procedure, a respective response data record 600 is created and stored at the keypress data store 208.

It should be understood that additional or other response data may be collected.

In an embodiment, the keypress procedure is defined so that, for each marketing option or experimental condition, there will be evaluation items that received approach keypresses and other evaluation items that received avoidance keypresses by each participant. For example, suppose the experimental conditions are faces that may be categorized as: beautiful female, average female, beautiful male, and average male. Suppose further that, for each experimental condition, there are twenty evaluation items, e.g., twenty pictures of beautiful female faces. In this case, a participant may enter approach keypresses for 18 of the 20 beautiful female faces, but avoidance keypresses for the other two. Furthermore, the keypress procedure may be defined in such a way that the participant while being presented with a current evaluation item associated with a given marketing option or experimental condition is unlikely to remember how he or she responded to prior evaluation items associated with this given marketing option or experimental condition.

Relative Preferences Data Processing

After each participant runs the keypress procedure, and the resulting response data is collected and stored at the keypress data store 208, the response data is processed to generate relative preference data for the marketing options represented by the evaluation items, as indicated at block 310. Specifically, the keypress data manipulation engine 206 accesses the response data records 600 stored at the keypress data store 208, and processes the information stored in those records 600 to generate relative preference data. As described herein, the relative preference data generated from the response data may include one or more entropy values, mean approach keypress, mean avoid keypresses, and standard deviation values for approach and avoidance keypresses, among others.

Shannon Entropy

In an embodiment, the keypress data manipulation engine 206 computes, for each participant, an approach Shannon entropy value ($H_+$) and an avoid Shannon entropy value ($H_-$) for each marketing option. The approach Shannon entropy value ($H_+$) may be computed as follows:

$$H_+ = \sum_{i=1}^{N} p_{+i} * \log(1/p_{+i})$$

where, i is the current evaluation item,

N is the total number of evaluation items for a given marketing option, $p_{+i}$ is the relative approach probability for the $i^{th}$ evaluation item, and the log function is to base 2.

The relative approach probability for the $i^{th}$ evaluation item corresponding to a given marketing option may be computed as follows:

$$p_{+i} = \frac{m_{+i}}{M}$$

where, $m_{+i}$ is the number of approach keypresses for $i^{th}$ evaluation item, and M is the total number of approach keypresses for all evaluation items corresponding to the same marketing option.

It should be understood that view time (or other response data) may be used instead of approach keypresses.

The avoidance Shannon entropy value ($H_-$) similarly may be computed as follows:

$$H_- = \sum_{i=1}^{N} p_{-i} * \log(1/p_{-i})$$

is where, i is the current evaluation item,

N is the total number of evaluation items for a given marketing option, $p_{-i}$ is the relative avoid probability for the $i^{th}$ evaluation item, and the log function is to base 2.

The relative avoid probability for the $i^{th}$ evaluation item corresponding to a given marketing option may be computed as follows:

$$p_{-i} = \frac{l_{+i}}{L}$$

where, $L_i$ is the number of avoid keypresses for $i^{th}$ evaluation item, and L is the total number of avoid keypresses for all evaluation items corresponding to the same marketing option.

Figure 7:
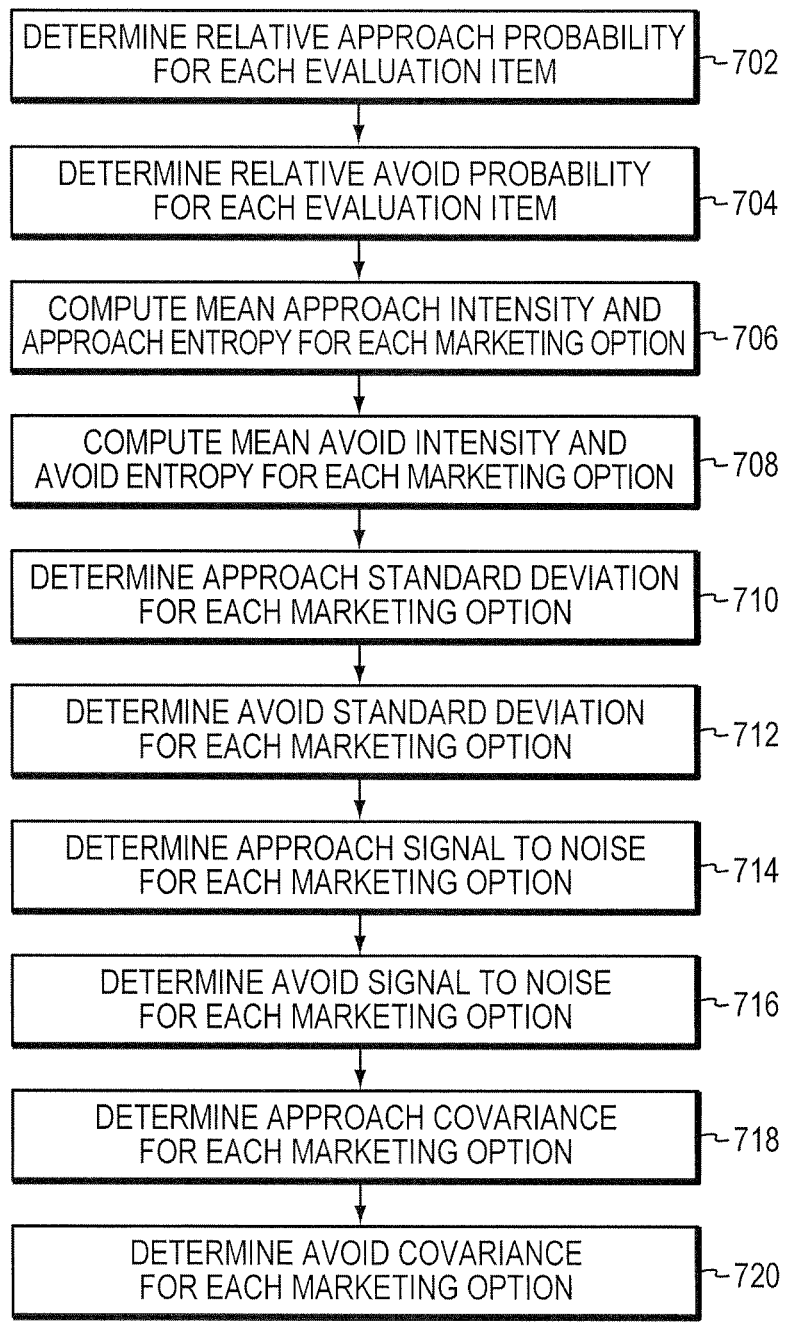

FIG. 7 is a flow diagram of a method of computing relative preference data. The keypress data manipulation engine 206 first may determine a relative approach probability for each evaluation item per participant, as indicated at block 702. The keypress data manipulation engine 206 may determine a relative avoid probability value for each evaluation item, as indicated at block 704. Continuing with the above example, suppose a participant entered a total of 400 approach keypresses while viewing the 20 photographs or video clips for proposed razor blade 1. Suppose further that the participant entered the following number of approach keypresses for the first three photographs or video clips of proposed razor blade 1:

photo/video clip #1: 9 approach keypresses photo/video clip #2: 15 approach keypresses photo/video clip #3: 12 approach keypresses The keypress data manipulation engine 206 may compute the relative approach probability associated with these three photographs or videoclips as follows:

p1=9/400=0.0225 p2=15/400=0.0375 p3=12/400=0.03

Using the computed relative approach probability values, an approach Shannon entropy value ($H_+$) may be computed for each marketing option for each participant, as indicated at block 706. A mean approach intensity value for each marketing option also may be computed. Furthermore, using the computed relative avoid probability values, an avoid Shannon entropy value ($H_-$) may be computed for each marketing option for each participant, as indicated at block 708. A mean avoid intensity value for each marketing option also may be computed. The approach Shannon entropy value ($H_+$) and the avoidance Shannon entropy value ($H_-$) computed for a participant may be as follows:

razor blade 1: {3.1, 2.2} razor blade 2: {0.5, 5.1} razor blade 3: {4.2, 1.3} razor blade 4: {1.9, 4.4}

It should be understood that other techniques or equations may be employed to compute the approach and avoid Shannon entropy values or other entropy values. For example, another way of computing suitable approach and avoid entropy values is given by:

$$H_+ = \sum_{i=1}^{N} p_{+i}/\log p_{+i}$$

$$H_- = \sum_{i=1}^{N} p_{-i}/\log p_{-i}$$

It should be understood that the keypress data manipulation engine 206 may be configured to compute only an approach Shannon entropy value, or only an avoid Shannon entropy value for each marketing option.

It also should be understood that the keypress data manipulation engine 206 may be configured to compute other entropy values, such as entropy values based on second or third order models. A suitable equation for computing entropy of a second order model is given by:

$$H = \sum_{i=1}^{m} p_i \sum_{j=1}^{m} P_{ji} \log P_{ji}$$

where $P_{ij}$ is the conditional probability that the present item is the $j^{th}$ item in the set given that the previous item is the $i^{th}$ item.

A suitable equation for computing entropy of a third order model is given by:

$$H = \sum_{i=1}^{m} p_i \sum_{j=1}^{m} Pji \sum_{j=1}^{m} P_{kji} \log P_{kji}$$

where $P_{kji}$, is the conditional probability that the present item is the $k^{th}$ item in the set given that the previous item is the $j^{th}$ item and the one before that is the $i^{th}$ item.

Standard Deviation

In an embodiment, the keypress data manipulation engine 206 also may compute an approach standard deviation value for each marketing option per participant, as indicated at block 710, and an avoid standard deviation value for each marketing option per participant, as indicated at block 712.

The approach standard deviation value may be computed as follows.

$$\sigma_+ = \sqrt{\frac{1}{N}\sum_{i=1}^{N}(K_i - K_M)^2}$$

where $\sigma_+$ is the approach standard deviation,

N is the total number of evaluation items for the subject marketing option, $K_i$ is the number of approach keypresses for the $i^{th}$ evaluation item, and $K_M$ is the mean number of approach keypresses for all of the evaluation items for the subject marketing option.

That is, to compute the approach standard deviation, the keypress data manipulation engine 206 computes the mean approach keypresses for all of the evaluation items for a given marketing option, $K_M$. The keypress data manipulation engine 206 computes the deviation of the approach keypresses for each evaluation item from the mean, and calculates the square of these deviations $(K_i-K_M)^2$. The keypress data manipulation engine 206 then calculates the mean of the squared deviations, and take the square root of the mean of the squared deviations.

The avoid standard deviation, $\sigma_-$, may be calculated in a similar manner.

Signal to Noise (SNR)

In an embodiment, the keypress data manipulation engine 206 is further configured to compute an approach signal to noise (SNR+) value, as indicated at block 714, and an avoid signal to noise (SNR−) value, as indicated at block 716. A suitable equation for computing SNR+ is given by:

$$SNR_+ = \text{mean approach keypress intensity}/\sigma_+$$

Similarly, a suitable equation for computing SNR− is given by:

$$SNR_- = \text{mean avoid keypress intensity}/\sigma_-$$

CoVariance

In an embodiment, the keypress data manipulation engine 206 is further configured to compute an approach covariance $(CoV_+)$ value, as indicated at block 718, and an avoid covariance $(CoV_-)$ value, as indicated at block 720. Suitable equations for computing $CoV_+$ and $CoV_-$ are given by:

$$CoV+ = 1/SNR_+$$

$$CoV- = 1/SNR_-$$

Thus, for each marketing option, the keypress data manipulation engine 206 may generate the following relative preference data per participant, along with other location and dispersion measures of relevance to his or her preference behavior:

{H+, H−, mean approach keypress, mean avoid keypress, $\sigma_+$, $\sigma_-$, $SNR_+$, $SNR_-$, $CoV_+$, $CoV_-$}

It should also be understood that pre-existing data may be utilized as the response data. For example, suppose a consumer product company or other entity already has a series of consumer rankings of items, such as books or movies, on a scale from 1-5, with 5 indicating a consumer's preference toward the item and 1 indicating a consumer's dislike of the item. In this case, the rankings could be converted as shown below:

| Rank | Keypress Equivalent |
|---|---|
| 1 | 20 avoid keypresses |
| 2 | 10 avoid keypresses |
| 3 | no keypresses |
| 4 | 10 approach keypresses |
| 5 | 20 approach keypresses |

It should be understood that other conversions of preexisting product or service rankings to response data could be applied. In this way, stores of preexisting rankings of products or services could be used to calculate relative preference data for subsequent analysis, as described herein.

Relative Preference Data Plotting and Analysis

The relative preference data may be analyzed in order to make judgments and decisions regarding the marketing options that were evaluated or reviewed by the participants. Specifically, the relative preferences data may be plotted and the plots printed, displayed or otherwise presented to an evaluator, as indicated at block 312 (FIG. 3). Specifically, an evaluator may command the plotting function 212 of the keypress data manipulation engine 206 to generate one or more plots for display on the management console 102 and/or for printing. In an embodiment, the plots may include one or more of a Trade-off plot, a Value Function plot and a Saturation plot.

In addition, the plots and/or the relative preference data may be analyzed to derive an outcome or select an action, as indicated at block 314. These decisions may include, among other things, selecting one or more of the proposed products, services or product packaging for release to the marketplace, selecting one or more of the proposed advertising or marketing programs, targeting one or more proposed products or services to a particular target audience or sub-market. Those skilled in the art will understand that other decisions may be made based on the relative preferences data.

The keypress data manipulation engine 206 may be further configured to search the relative preference data for patterns and/or to organize the relative preference data in certain ways, and to present identified patterns to the evaluator to facilitate the selection of an outcome or action.

Preference Trade-Off Plot

Figure 8:
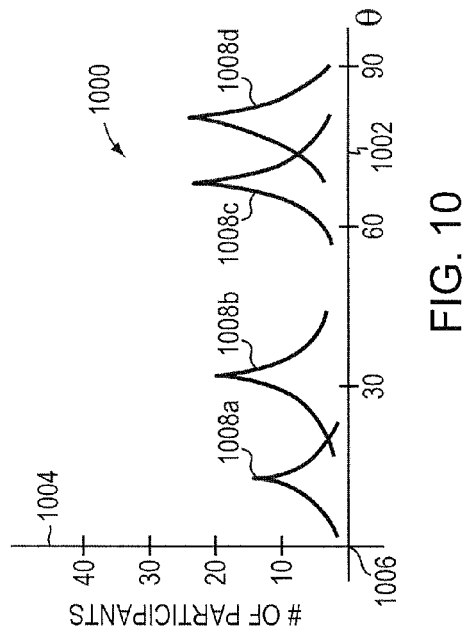
FIGS. 8-21 are plots of relative preferences data.

FIG. 8 is an illustration of a Trade-off plot 800 of relative preferences data computed for a single participant. The Trade-off plot 800 includes an x-axis 802 and a y-axis 804 that intersect at origin 805. The x-axis 802 represents H− values while the y-axis 804 represents H+ values. As indicated above, for each marketing option, an {H+, H−} value pair may be computed. Accordingly, assuming the participant ran the keypress procedure for four marketing options, the {H+, H−} value pair 806*a-d* computed for each marketing option is plotted in the Trade-off Plot 800. Research by the inventor has demonstrated that the {H+, H−} value pairs of individuals and groups typically, but not always, fall generally along an arc 808 of constant radius, r, from the origin 805. This arc 808, moreover, provides an indication of the relative preference ordering of the four marketing options by the participant. Specifically, the marketing options that appear toward the upper left of the plot 800, i.e., marketing options 3 and 1, which have high $H_+$ values, were preferred by this participant while the marketing options that appear toward the lower right portion of the plot 800, i.e., marketing options 4 and 2, which have high $H_-$ values, were disliked by this participant.

The curve fitting component 214 may be directed to find a best-fit curve, such as arc 808, through the {H+, H−} value pairs 806.

In addition to plotting the {H+, H−} value pairs for a single participant, the evaluator may command the plotting function 212 to plot the {H+, H−} value pairs for all of the participants on a single Trade-off plot. By reviewing such a Trade-off plot, the evaluator may ascertain a preference for a particular marketing option by a majority of the participants, a dislike of a particular marketing option by a majority of the participants, etc. This interpretation may be quantified by determining the center of mass for the {H+, H−} value pairs for each marketing option or experimental condition, and comparing between these centers of mass for each marketing option or experimental condition. Alternately, the quantification of differences between marketing options or experimental conditions may be performed by evaluating radial and angular distribution plots, as described below, and showing a segregation of distributions between experimental conditions.

Alternately, it may be shown by application of bucket statistics, which are used in voxel-based neuroimaging analyses, such as statistical parametric mapping. This technique may be applied to the preference trade-off plots, and these graphs can be pixilated in the radial and polar dimensions. The incidence of real and hypothetical subject presence in each bucket or pixel can be compared to a Gaussian distribution, in a t-statistic analysis. The t-value can then be converted into a pseudocolor map on the preference trade-off plot, quantifying the segregation of experimental data between any two or more experimental conditions.

The keypress data manipulation engine 206 may be further configured to perform these tasks.

The evaluator may also direct the keypress data manipulation engine 206 to determine the number of participants that ranked the four marketing options in the same relative preference order. Suppose this determination produces the following relative preferences data:

| Relative Preference Order | No. of Participants | % of Total Participants |
| --- | --- | --- |
| 3, 1, 4, 2 | 96 | 48 |
| 1, 3, 2, 4 | 56 | 28 |
| 2, 1, 4, 3 | 22 | 11 |
| 3, 2, 4, 1 | 16 | 8 |
| 3, 4, 1, 2 | 10 | 5 |

A review of this relative preferences data by the evaluator reveals that 152 or 76% of the participants preferred marketing options 3 and 1 out of the four marketing options, and of these 152 participants most of them preferred marketing option 3 over marketing option 1. As a result, a decision may be made to release the proposed product or service that corresponds to marketing options 1 and 3 to the marketplace.

Radial and Angular Distribution Plots.

With reference to FIG. 8, each {H+, H−} value pair also has polar coordinates, e.g., {r, θ}, where r is the radial distance from the origin of the Trade-off Plot 800 to the respective {H+, H−} value pair, and θ is the angle of the radial, r, from the x-axis 802. Considering entropy pair 806d, for example, there is a radius, $r_4$, 812 and a polar angle, $θ_4$, 814. Thus, for every participant, in addition to a {H+, H−} value pair for each marketing option, there is also a polar coordinate pair for each marketing option.

In an embodiment, the keypress data manipulation engine 206 is configured to derive the polar coordinates, e.g., {r, θ}, for each marketing option for all of the participants. The plotting function 212 of the keypress data manipulation engine 206 is configured to produce a radial distribution plot and/or an angular distribution plot for display at the management console 102 and/or for printing.

Figure 9:
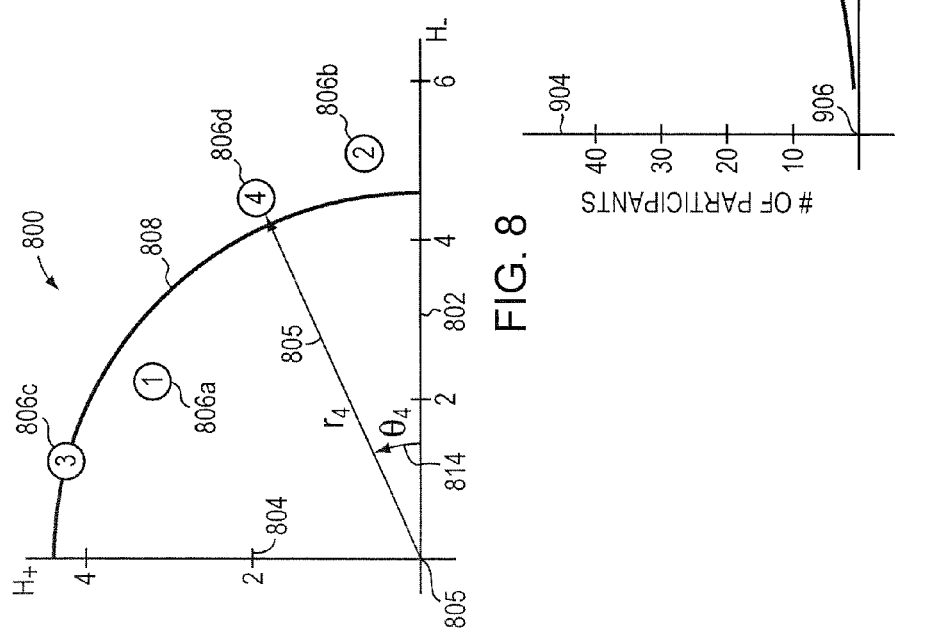

FIG. 9 is an illustration of a radial distribution plot 900, which has an x-axis 902 and a y-axis 904 that intersect at an origin 906. The x-axis 902 represents the radial distance, r, of the {H+, H−} value pairs for all of the participants. The y-axis 904 indicates the number of participants, or other frequency information related to the participants. Based on research by the inventor, the radial distribution plot typically takes the form of curve 908. Curve 908, moreover, may have a full width half maximum measure (W) 910, or another dispersion measure which can be tested with the Levene statistic for differences in variance. The size of W 910 of curve 908 provides the evaluator with an indication of how restrictive the range of relative preference is, for a group of participants toward the marketing option represented by the curve 908. A narrowed spectra, as demonstrated by a low W measure, shows that these participants have less variance in their responses and thus greater certainty in their choice behavior. A wide spectra, as demonstrated by a high W measure, shows that these participants have a reduced certainty in their choices.

Figure 10:
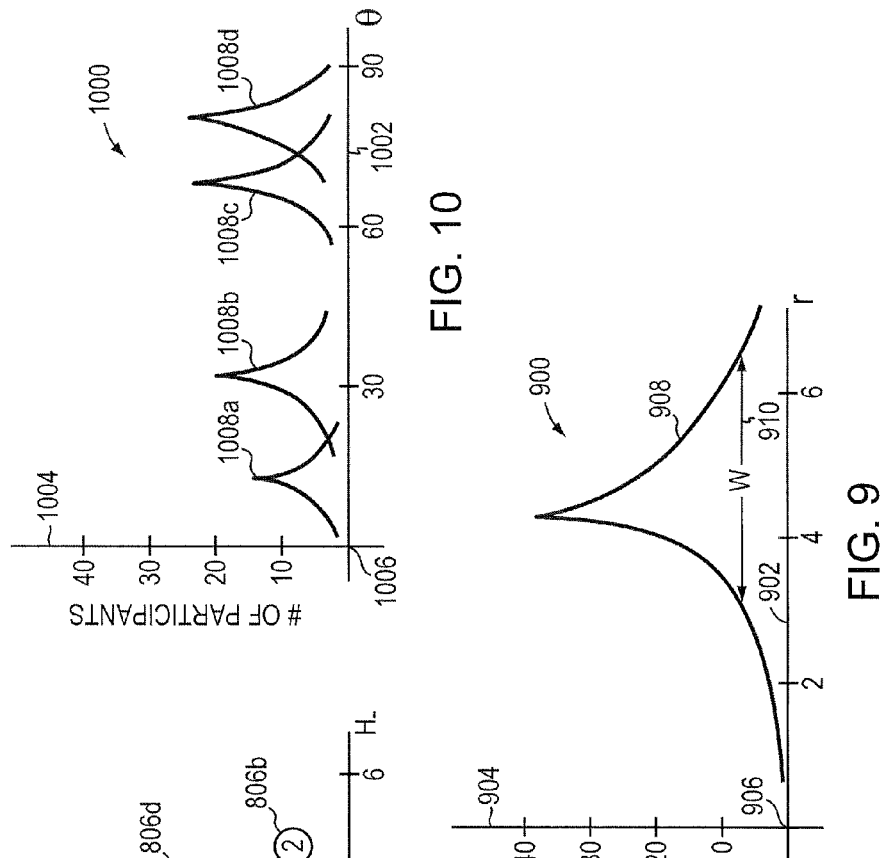

FIG. 10 is an illustration of an angular distribution plot 1000, which has an x-axis 1002 and a y-axis 1004 that intersect at an origin 1006. The x-axis represents the angle, θ, of the {H+, H−} value pairs for all of the participants. The y-axis 1004 indicates the number of participants. The angular distribution plot 1000 may show a separate curve, e.g., curves 1008a-d, for each of the marketing options. That is, curve 1008a may correspond to marketing option 2, curve 1008b may correspond to marketing option 4, curve 1008c may correspond to marketing option 1, and curve 1008d may correspond to marketing option 3. The closer a curve is to θ=90 degrees, e.g., curves 1008 and 1008d, the higher the approach entropy for the respective marketing option. Thus, the marketing options represented by curves near θ=90 were found by the participants to be desirable. Similarly, the closer a curve is to θ=0 degrees, the higher the avoid entropy for the respective marketing option. Thus, the marketing options represented by curves near θ=0 were disliked by the participants.

Figure 13:
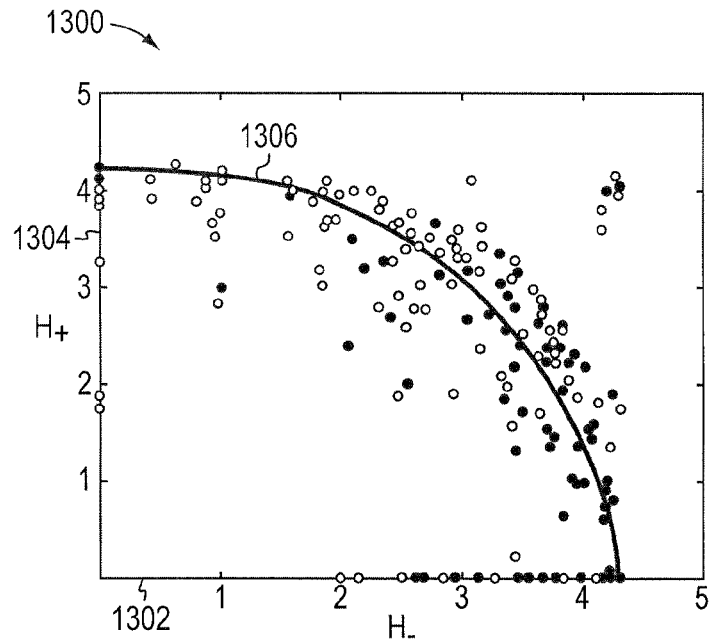

FIG. 13 is an exemplary Trade-off plot 1300 for a plurality of participants for four marketing options. As with plot 800, Trade-off plot 1300 has an x-axis 1302 that represents avoid entropy, $H_-$, and a y-axis 1304 that represents approach entropy $H_+$ that intersect at origin 1305. Depending on the noise characteristics of the experimental set-up, the relative preference data of Trade-off plot 1300, moreover, may have a central tendency that may be approximated by an arc 1306 of constant radius from the origin 1305.

The Trade-off plot, also referred to as a "preference trade-off", represents a manifold across many subjects which can have a central tendency characterized by radius $r=\sqrt{(H_+^2+H_-^2)}$. The manifold generally has an internal border characterized by the simulation of a participant only making one of two decisions—to approach or to avoid. It has an outside border characterized by range-matched Gaussian noise simulated from hypothetical participants who make responses and are each matched to one real participant in the cohort for the range of responses. Many individual participants will produce responses across a set of experimental stimuli that fall clustered along the radius $r=\sqrt{(H_+^2+H_-^2)}$ line; but this may not be necessarily so.

In an embodiment, the "preference trade-off" plot is evaluated or considered in light of the "value function" plot and the "saturation" plot, as described below.

Figure 16:
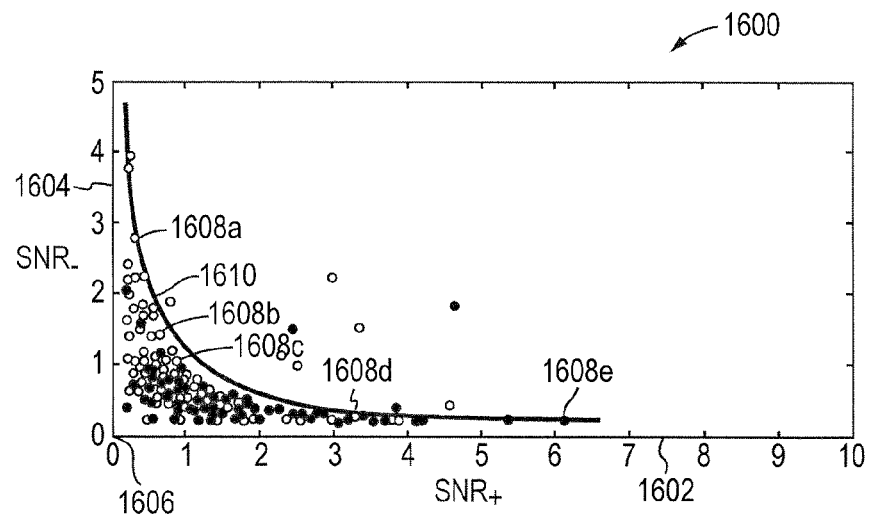

It should be understood that one or more preference Trade-off plots may be generated based on other relative preference data besides Shannon entropy. For example, the plotting function 212 may be configured to generate an SNR Trade-off plot. FIG. 16 is an illustration of an SNR Trade-Off plot 1600. The SNR Trade-off plot 1600 includes an x-axis 1602 and a y-axis 1604 that intersect at origin 1606. The x-axis 1602 represents $SNR_-$ values while the y-axis 1604 represents $SNR_+$ values. As indicated above, for each marketing option, an $\{SNR_+, SNR_-\}$ value pair may be computed. These $\{SNR_+, SNR_-\}$ value pairs, e.g., value pairs 1608a-d, are plotted in the SNR Trade-off plot 1600. The envelope/curve fitting component 214 may be configured and/or directed to derive a boundary envelope 1610 for the relative preference data presented in the SNR Trade-off plot 1600.

Figure 17:
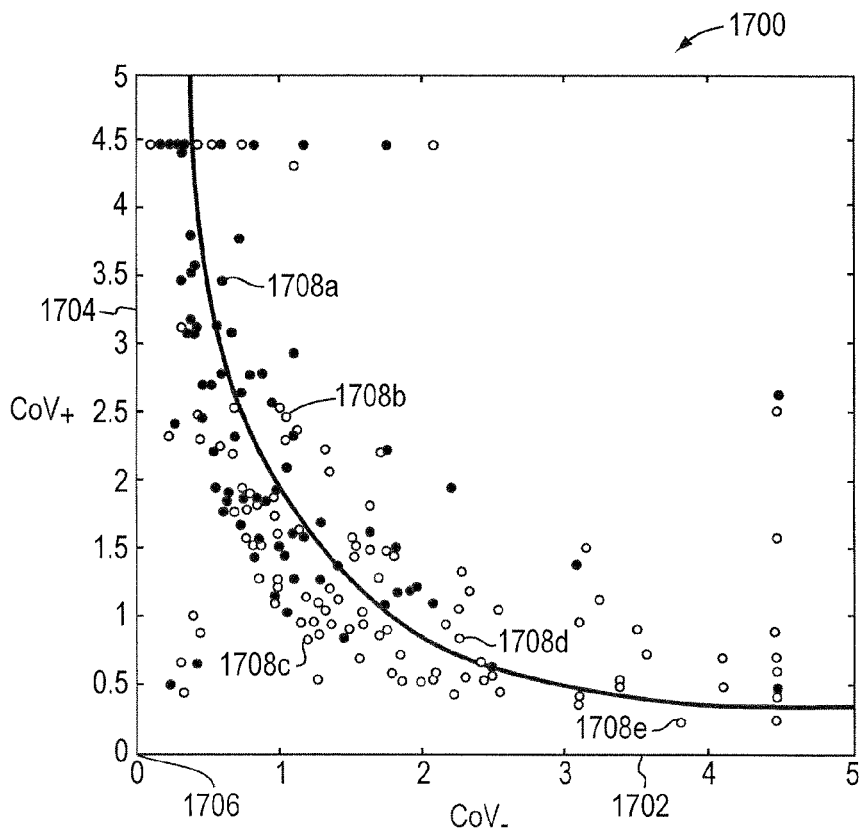

The plotting function 212 may be further configured to generate a CoV Trade-off plot. FIG. 17 is an illustration of a CoV Trade-off plot 1700. The CoV Trade-off plot 1700 includes an x-axis 1702 and a y-axis 1704 that intersect at origin 1706. The x-axis 1702 represents $CoV_-$ values while the y-axis 1704 represents $CoV_+$ values. As indicated above, for each marketing option, a $\{Cov_+, CoV_-\}$ value pair may be computed. These $\{Cov_+, CoV_-\}$ value pairs, e.g., value pairs 1708a-e, are plotted in the CoV Trade-off plot 1700. The envelope/curve fitting component 214 may be configured and/or directed to fit a curve, e.g., curve 1710, to the relative preference data contained in the CoV Trade-off plot 1700.

Value Function Plot

Figure 11:
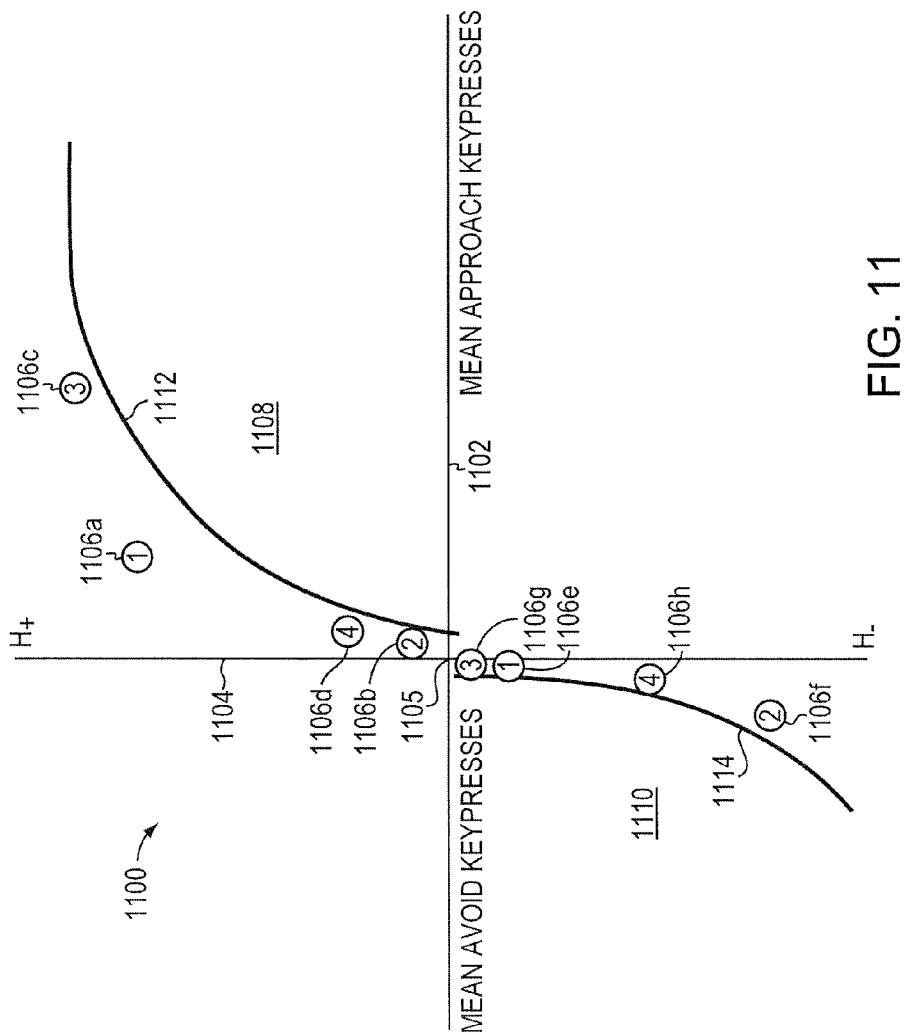

FIG. 11 is an illustration of a Value Function plot 1100 for the relative preference data generated for a single participant. The Value Function plot 1100 includes an x-axis 1102 and a y-axis 1104 that intersect at origin 1105. The x-axis 1102 represents mean keypresses with the positive side of the x-axis 1102 representing mean approach keypresses and the negative side of the x-axis 1102 representing mean avoid keypresses. The y-axis 1104 of the value function plot 1100 represents the Shannon entropy, with the positive side of the y-axis 1104 representing $H_+$ and the negative side of the y-axis 1104 representing $H_-$.

As indicated above, for each marketing option, there is a {H+, mean approach keypress} value pair and a {H−, mean avoid keypress} value pair. For each marketing option, these two value pairs are plotted on the Value Function Plot 1100, as indicated at 1106a-h. That is, for each marketing option, e.g., marketing option 1, there are two points that are plotted, one point, e.g., 1106a, in an $H_+$/mean approach keypress quadrant 1108 of the value function plot 1100, and the other point, e.g., 1106e, in a $H_-$/mean avoid keypress quadrant 1110.

The order in which the data points 1106a-h for the marketing options appear on the Value Function Plot 1100 provides an indication of the participant's relative ordering of the marketing options. Specifically, a participant's preference toward a marketing option increases in order of increasing $H_+$ values, and the participant's dislike of a marketing option increases in order of increasing $H_-$ values. The participant whose relative preference data appears in the value function plot 1100 ranked the four marketing options in the following relative order in terms of approach from high to low: 3, 1, 4, 2. The participant also ranked the four marketing options in the following order in terms of avoid from strongly avoid to weakly avoid: 2, 4, 1, 3. As shown, for this participant, the relative order of the marketing options in the avoid quadrant 1110 of the Value Function plot 1100 is symmetrical to the relative order of the marketing options in terms of approach. It should be understood that this may not always be the case.

Indeed, the relative ordering of preferences across the viewed materials, e.g., evaluation items and/or marketing options, may be different between the positive and negative keypress portions of the graph. This difference can be considered an indication of uncertainty/inconsistency connected to preference decisions and judgments. The differences in the relative orderings between the positive and negative components of the value function plot can be quantified by a Wilcoxin test of rank order. Strong inconsistencies in rank ordering of relative preferences for approach and avoidance responses may be associated with a trade-off plot where {H+, H−} value pairs are plotted far from the central tendency of the group manifold, and do not obviously convey rank ordering of relative preferences. Where consistency does exist in the value function graph between approach and avoidance responses for one or more experimental conditions, relative preference can be interpreted for that subset of experimental conditions in that participant or subgroup of participants. For all participants, it may be important to assess the difference in slopes between the approach and avoidance sections of the value function plot, to determine how "loss averse" a participant or a subgroup of participants is regarding the marketing options or experimental conditions tested. The extent of loss aversion may segregate subgroups of participants and suggest a marketing strategy toward one set of consumers that emphasizes how a product or a strategy promoting a product reduces some aspect of loss or bad outcome. The difference in slopes between approach and avoidance components of the value function plot is one part of how parameter fitting information for the graphs of participants can be useful. Other features of the parameter fits to the value functions of individuals include that related to the intercept of the x-axis, which reflects the core transaction costs that a participant sees around any consumatory, defensive, or procreative activity.

The curve fitting component 214 may evaluate the data 1106a-d plotted in the $H_+$/mean approach keypress quadrant 1108 of the value function plot 1100 to determine an approach boundary envelope 1112. Research by the inventor has shown that the approach boundary envelope 1112 may follow a power function given by:

$$f(x)=ax^b+c$$

where a, b, and c are variables, or it may be approximated by a logarithmic function given by:

$$f(x)=a*\log_B[(x+c)]+d$$

where a, b, c and d are variables, and B is the base of the logarithm.

The curve fitting component 214 may also evaluate the data 1106e-h plotted in the $H_-$/mean avoid keypress quadrant 1110 of the value function plot 1100 to determine an avoid boundary envelope 1114. Research by the inventor has shown that the avoid boundary envelope 1114 may follow a power function given by:

$$f(x)=ax^b+c$$

where a, b and c are variables, or it may be approximated by a logarithmic function given by:

$$f(x)=a*\log_B(x+c)+d$$

where a, b, c, and d are variables and B is the base of the logarithm.

It should be understood that a single Value Function Plot 1100 may be generated using the preference data for all of the participants that ran the keypress procedure. Similarly, separate Value Function Plots 1100 may be generated for those participants who had the same order of marketing options in terms of approach, avoidance or both.

Figure 14:
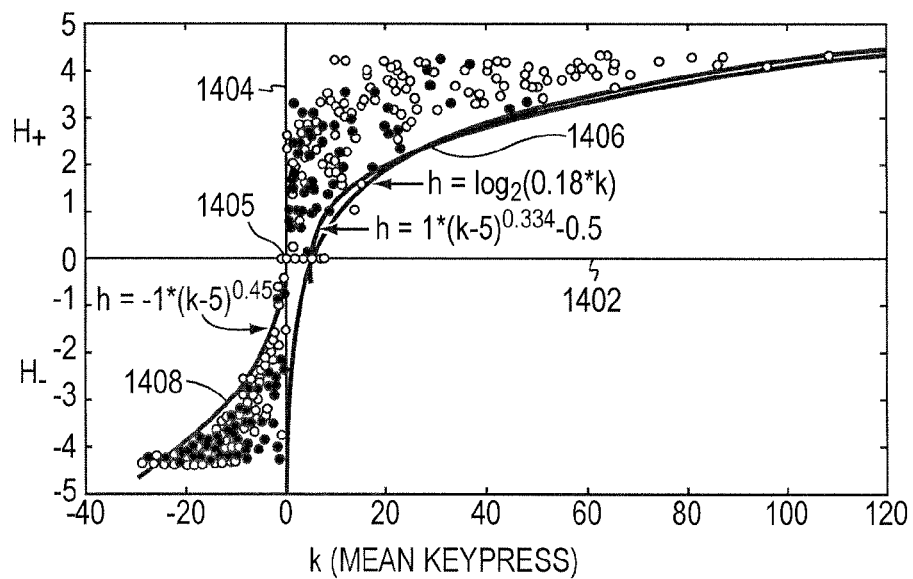

FIG. 14 is an exemplary Value Function plot 1400 for a plurality of participants for four marketing options. As with plot 1100, the Value Function plot 1400 has an x-axis 1402 and a y-axis 1404 that intersect at origin 1405. The x-axis 1402 represents mean keypresses with the positive side of the x-axis 1402 representing mean approach keypresses and the negative side of the x-axis 1402 representing mean avoid keypresses. The y-axis 1404 represents the Shannon entropy, with the positive side of the y-axis 1404 is representing $H_+$ and the negative side of the y-axis 1404 representing $H_-$.

The relative preference data within the approach entropy ($H_+$)/approach keypress portion of the Value Function plot 1400 follows an approach boundary envelope 1406. As shown in FIG. 14, the approach boundary envelope 1406 may fit or conform to a power function, e.g., $H_+ = 1*(k-5)^{0.334} - 0.5$. Similarly, the relative preference data within the avoid entropy ($H_-$)/avoid keypress portion of the Value Function plot 1400 follows an avoid boundary envelope 1408. As shown in the figure, the avoid boundary envelope 1408 may fit or conform to a power function, e.g., $H_- = -1*(-k)^{0.45}$.

The approach and avoid boundary envelopes 1406, 1408 may also fit or conform to logarithmic functions.

The "value function plot" is either an envelope for group data, or a function for individual data. In both of these scenarios, it can be modeled as a logarithm, or as a power function. This means that the $H_+$/mean approach keypress plot and $H_-$/mean avoidance keypress plot are both considered as a logarithm, or as a power function. Given that alteration of the x-axis into logarithmic coordinates produces an envelope (group data) or function (individual data) that becomes linear, the envelope or function could be considered to be a power law. This argues more strongly for the power function formulation of both the H+/mean approach keypress plot and H−/mean avoidance keypress plot. Another argument for using the power function formulation of the value function graph, is that the "saturation function" is best fit as an envelope (group data) or function (individual data) when it incorporates a power formulation.

Figure 18:
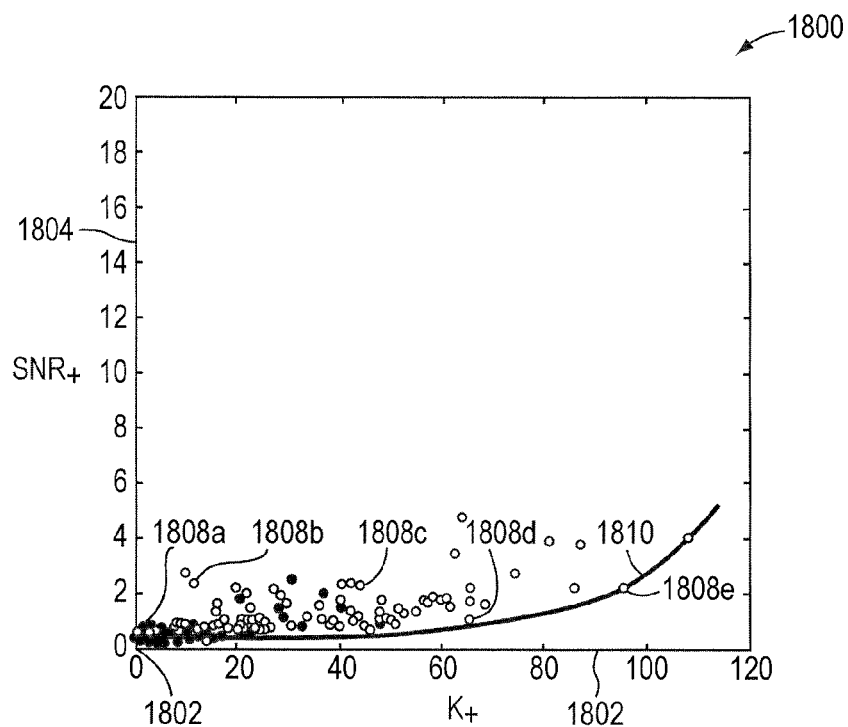

It should be understood that one or more Value Function plots may be generated based on other relative preference data besides Shannon entropy. For example, the plotting function 212 may be configured to generate one or more SNR Value Function plots. FIG. 18 is an illustration of an SNR+ Value Function plot 1800. The SNR+ Value Function plot 1800 has an x-axis 1802 and a y-axis 1804 that intersect at origin 1806. The x-axis 1802 represents mean approach keypress intensity (K+) values while the y-axis 1804 represents SNR+ values. As indicated above, the relative preference data includes a {SNR+, K+} value pair for each of the marketing options. These {SNR+, K+} value pairs, e.g., value pairs 1808a-e, are plotted in the SNR+ Value Function plot 1800. The envelope/curve fitting component 214 may be configured and/or directed to determine an envelope 1810 for the relative preference data contained in the SNR+ Value Function plot 1800.

Figure 19:
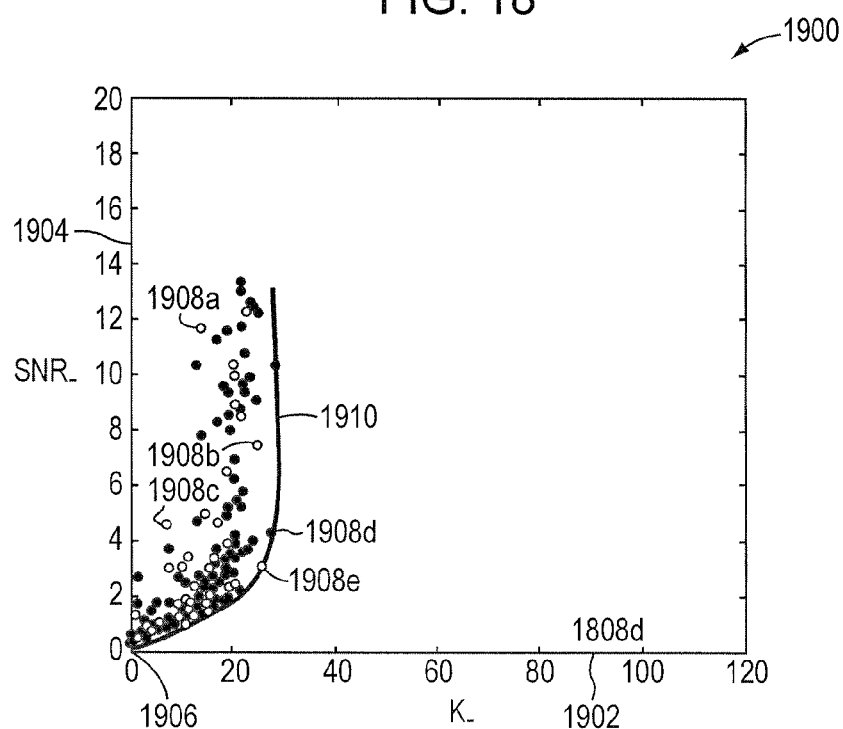

FIG. 19 is an illustration of an SNR− Value Function plot 1900. The SNR− Value Function plot 1900 has an x-axis 1902 and a y-axis 1904 that intersect at origin 1906. The x-axis 1902 represents mean avoid keypress intensity (K−) values while the y-axis 1904 represents SNR− values. As indicated above, the relative preference data includes a {SNR−, K−} value pair for each of the marketing options. These {SNR−, K−} value pairs, e.g., value pairs 1908a-e, are plotted in the SNR− Value Function plot 1900. The envelope/curve fitting component 214 may be configured and/or directed to determine an envelope 1910 for the relative preference data contained in the SNR− Value Function plot 1900.

Figure 20:
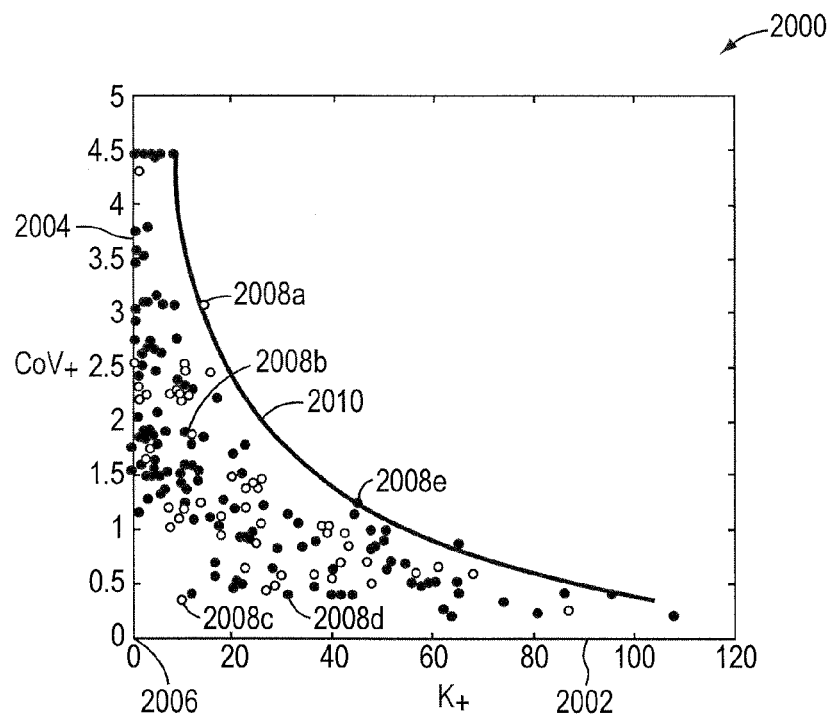

The plotting function 212 may be further configured to generate one or more CoV Value Function plots. FIG. 20 is an illustration of a CoV+ Value Function plot 2000. The CoV+ Value Function plot 2000 has an x-axis 2002 and a y-axis 2004 that intersect at origin 2006. The x-axis 2002 represents mean approach keypress intensity (K+) values while the y-axis 2004 represents CoV+ values. As indicated above, the relative preference data includes a {CoV+, K+} value pair for each of the marketing options. These {CoV+, K+} value pairs, e.g., value pairs 2008a-e, are plotted in the CoV+ Value Function plot 2000. The envelope/curve fitting component 214 may be configured and/or directed to determine an envelope 2010 for the relative preference data contained in the SNR− Value Function plot 2000.

Figure 21:
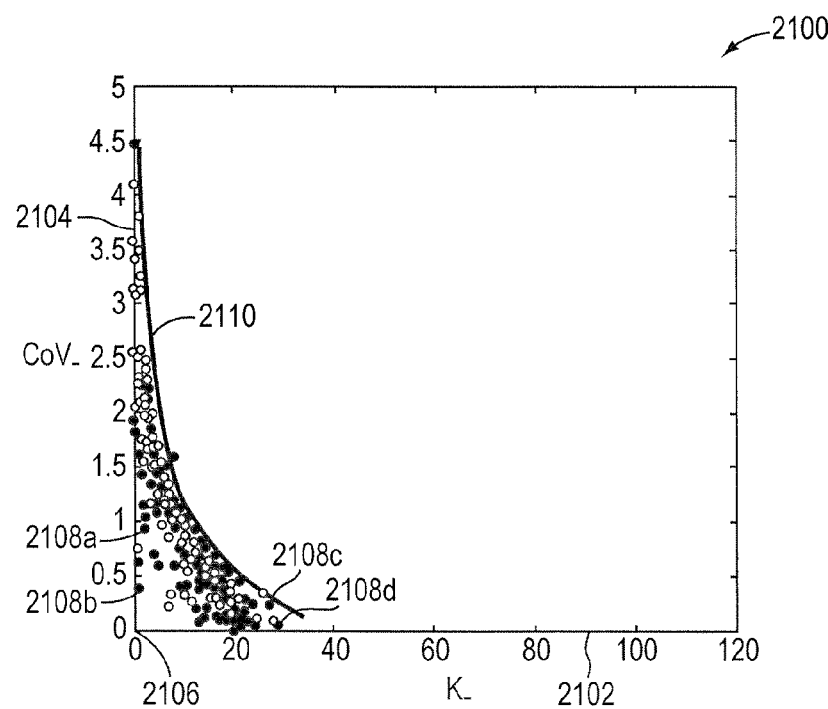

FIG. 21 is an illustration of a CoV− Value Function plot 2100. The CoV− Value Function plot 2100 has an x-axis 2102 and a y-axis 2104 that intersect at origin 2106. The x-axis 2102 represents mean avoid keypress intensity (K−) values while the y-axis 2104 represents CoV− values. As indicated above, the relative preference data includes a {CoV−, K−} value pair for each of the marketing options. These {CoV−, K−} value pairs, e.g., value pairs 2008a-d, are plotted in the CoV− Value Function plot 2100. The envelope/curve fitting component 214 may be configured and/or directed to determine an envelope 2110 for the relative preference data contained in the SNR− Value Function plot 2100.

Saturation Plot

Figure 12:
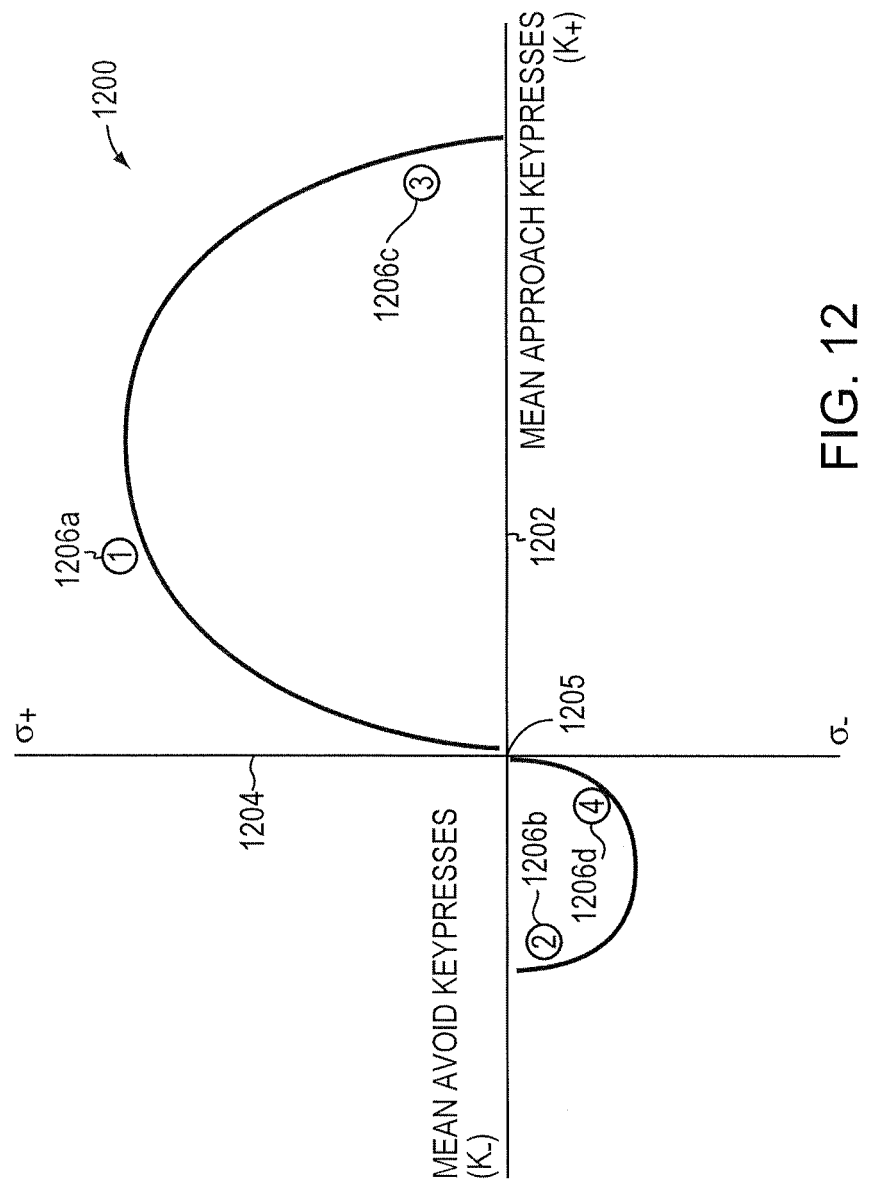

FIG. 12 is an illustration of a saturation plot 1200 for the relative preference data generated by a single participant. The Saturation plot 1200 has an x-axis 1202 and a y-axis 1204 that intersect at origin 1205. The x-axis 1202 represents mean keypresses with the positive side of the x-axis 1202 representing mean approach keypresses, and the negative side of the x-axis 1202 representing mean avoid keypresses. The y-axis 1204 represents the standard deviation, with the positive side of the y-axis 1204 representing standard deviation for approach, and the negative side of the y-axis 1204 representing standard deviation for avoid.

As indicated above, for each marketing option, there is a {$\sigma_+$, mean approach keypress} value pair and a {$\sigma_-$, mean avoid keypress} value pair. These two value pairs are plotted on the Saturation Plot 1200, as indicated at 1206a-d.

The distance a value pair 1206a-d is away from the x-axis, i.e., the magnitude of the standard deviation, indicates how difficult the decision was for the participant to either approach or avoid the respective marketing option. As indicated in the Saturation Plot 1200 although the participant entered approach keypresses for both marketing options 1 and 3, it was a significantly easier for the participant to decide to approach marketing option 3, than marketing option 1. In contrast, the degree of difficulty in deciding how to respond to marketing options 2 and 4, which both received avoid keypresses, was not that great.

It should be understood that a Saturation Plot 1200 may be generated using the preferences data for all of the participants that ran the keypress procedure. Similarly, separate Saturation Plots 1200 may be generated for those participants who had the same relative order of marketing options.

Based on a review of the saturation plot 1200 for a series of marketing options, a consumer product company may determine that, although a given marketing option received significant approach keypresses from the participants, the participants' decision to approach the given marketing option was difficult. Accordingly, the company may choose to proceed with a different marketing option that may have received substantially the same (or even slightly less) approach keypresses from the participants but, as reflected by the Saturation Plot 1200, the participants had less difficulty approaching this marketing option. Where participants had difficulty with judgment and decision-making regarding one or more marketing options or experimental conditions, as indicated by increased standard deviation estimates relative to other marketing options or experimental conditions, this data can then be evaluated with regard to relative loss aversion estimated from the approach and avoidance components of the value function, and to uncertainty/inconsistency with regard to differences in the relative ordering of approach and avoidance assessments for marketing options or experimental conditions. The increased standard deviation observed with one or more marketing options or experimental conditions may be due to ambivalent assessments (i.e., both high positive and high negative assessments for items in an experimental condition, or the same contradiction with low keypress assessments), or may be due to increased loss aversion, making a small set of avoidance keypress responses be amplified relative to the approach keypresses. It should be understood that there are other ways by which the interpretations extracted from the standard deviation data may be integrated with features extracted from the value function graph and the trade-off graph.

Figure 15:
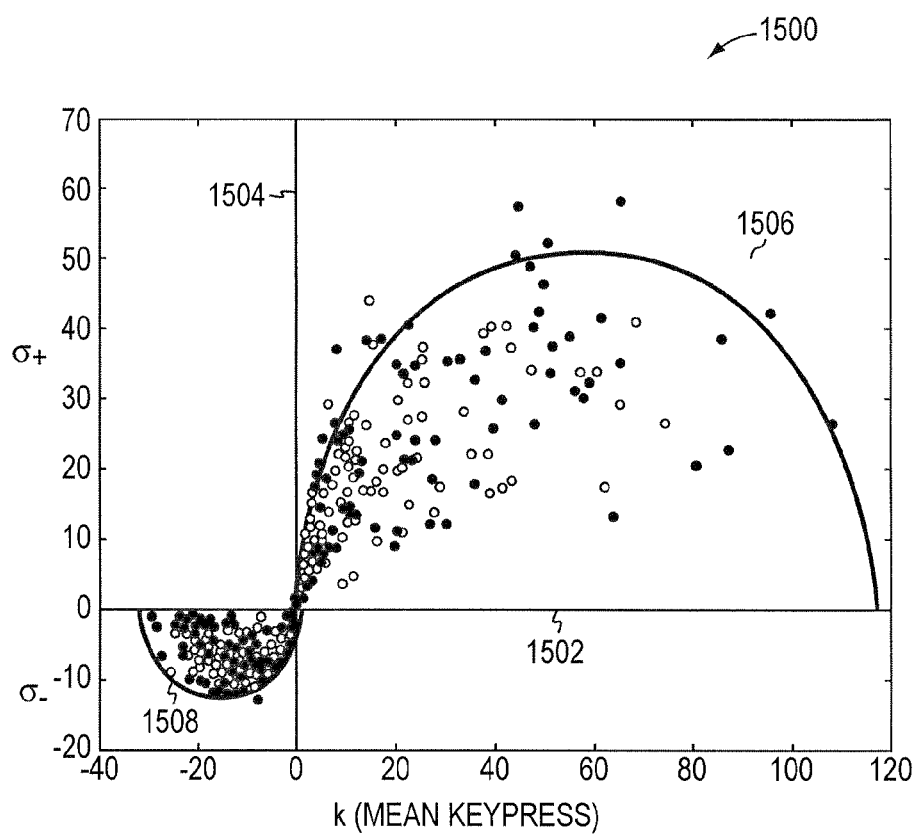

FIG. 15 is an exemplary Saturation plot 1500 for a plurality of participants for four marketing options. As with plot 1200, Saturation plot 1500 has an x-axis 1502 that represents mean keypresses, and a y-axis 1504 that represents standard deviation. The approach or positive standard deviation values follow an approach boundary envelope 1506 that is generally curved and leaves the baseline, achieves a maximum, and then approaches the baseline again, in the form of a saturation function. Similarly, the avoid or negative standard deviation values follow an avoid boundary envelope 1508 that is also curved but of smaller radius.

Graphs of group data for $\{K_{\pm}, \sigma_{\pm}\}$ produce distributions with well-delineated envelopes as illustrated in FIG. 15, which will be recurrent across many different types of marketing options or experimental conditions, and are likely to not be due to ceiling/floor effects in the behavioral response. In exemplar graphs, $\{\sigma_{\pm}\}$ reaches a maximum/minimum before moving toward the K axis, so that the intensity versus variance goes up and returns toward baseline with repetitive behaviors, indicating a saturation relationship.

The envelope/curve fitting component 214 may be configured to determine the boundary envelopes 1506, 1508. The fitting parameters for the envelope are different for approach and avoidance (avoidance saturation is more compact than approach saturation), although the general description of the envelope is similar.

The boundary envelopes 1506, 1508 for the Saturation plot 1500 may be given by:

$$\sigma_+ = aK_+^b \cos\left(\frac{K_+}{c}\right)$$

$$\sigma_- = aK_-^b \cos\left(\frac{K_-}{c}\right)$$

where, a, b and c are variables.

In an embodiment, the plotting function 212 and the kepress data manipulation engine 206 are configured to generate all three plots: Trade-off, Value Function, and Saturation from the generated relative preference data. An evaluation of all three plots provides significant information for deciding on a course of action with regard to the evaluated marketing options. Nonetheless, it should be understood that, in other embodiments, the plotting function 212 and the keypress manipulation engine 206 may be configured to generate only one of the Trade-off, Value Function, or Saturation plots. In still further embodiments, the plotting function 212 and the keypress manipulation engine 206 may be configured to generate some combination of the Trade-off, Value Function, or Saturation plots that is less than all three plots.

As described herein, relative preference data may be analyzed or evaluated to assess (i) the relative ordering of preferences across the viewed materials, e.g., evaluation items and/or marketing options, along the trade-off plot, value function plot, and saturation plot, i.e., the consistency of rank ordering across these three plots, (ii) the relative difference in steepness of slope between curves fitted to the avoidance and approach portions of the value function, (iii) the uncertainty associated with preference by the comparison of relative orderings between the avoidance and approach components of the value function plot, which may be quantified by a Wilcoxen test of rank ordering, and between each of these value function components and the preference trade-off graph, (iv) the parameter fits of the value function across persons in or between groups, (v) the dispersion and characteristics of the radial and polar sampling of the preference trade-off, (vi) the stimuli for which subjects found preference decisions to be relatively "hard" (where the standard deviation is highest) versus "easy" (where the standard deviation is least). If an answer regarding relative preference is not optimal, or unclear, moreover, these procedures can be repeated or redone with new evaluation items, experimental parameters and/or stimuli until an answer or optimal outcome is achieved.

Across the three types of graphs described, information that is extracted may be used to produce an integrated interpretation of relative preference for an individual, for a sub-group of individuals, and for a large group comprising distinctive sub-groups. The relative orderings of marketing options or experimental conditions along a trade-off plot, a value function plot, or a saturation plot may be listed in rank order, as indicated at point (i) above, and may include a scalar value of the K or H value associated with their graphing so that the set of marketing options or experimental conditions can be described as a vector for each participant or combined for each sub-group or group. Individuals may be clustered on the basis of rank orderings of preference or their preference vectors, and differences in preferences can be quantified between the sub-groups using standard nonparametric techniques for the location and dispersion across the group of the K value associated with the two marketing options or experimental conditions being compared across sub-groups. The consistency or uncertainty associated with preference may be compared between sub-groups of people by evaluating the difference in rank ordering of marketing options or experimental conditions between approach and avoidance components of the graph, as indicated at point (iii) above. This uncertainty/consistency may be quantified by a Wilcoxen test of rank ordering.

Differences in rank order of preferences and in the uncertainty/consistency of preferences may be important factors in assessing participant behavior. These differences also may be combined with an assessment of the ease with which participants make decisions, as indicated at point (vi) above. Rank order and consistency of rank order between approach and avoidance do not convey the relative difficulty of the judgment and decision-making involved with the preference, and thus may be supplemented by an assessment of which marketing options or experimental conditions were associated with the largest standard deviations. These types of information can be further supplemented by information regarding the relative steepness of the approach and the avoidance value functions for the participants. The slope of each component of the value function conveys how much a participant is willing to trade for a particular level of satisfaction or personal utility, as indicated at point (ii) above, related to approach/positive and avoidance/negative goal-objects. The less steep the slope, the more the participant is willing to trade for a particular level of satisfaction or personal utility. Some sets of participants may have strong similarities regarding their rank ordering of marketing conditions or experimental conditions, but may have significant differences in how much they are willing to pay for the same level of satisfaction. There also may be differences in terms of the transaction costs that participants are willing to incur, which is observed by the x-intercept of the value function, and can be extracted from the parameter fits for this function, as indicated at point (iv) above.

There also may be characteristics related to how uncertainty/consistency of rank order in the value function and the saturation function are conveyed with the preference trade-off plot. Trade-off plots may not show distinct orderings of market options or experimental conditions across a set of experimental conditions, and may not fall on the manifold observed across many subjects. In such cases, one may find significant inconsistencies between rank ordering of approach and avoidance responses in the value function and saturation function, indicating relative preferences that are likely to be strongly influenced by local factors, such as recent public discourse in the news regarding a marketing option or experimental condition or hedonic deficit state effects when the time scale of change associated with relative need for an experimental condition is short, e.g., food takes on increased positive/approach assessments with hunger and is devalued after satiation. Some features of a trade-off plot may not be readily apparent in the other plots, though. For instance, some participants may show a significant restriction in the range or dispersion of their preferences across the trade-off plot. Such a restriction in their trade-off plot may have diagnostic significance for psychiatric illness, such as addiction, or may have implications for how they are willing to NOT have a broadly distributed set of relative preferences. Such participants, like investors with restricted portfolios of assets or investments, may be strategic in their preferences for the short term. In general, such a profile may not be very adaptive to environmental change or changes in local influences over the long run.

It should be understood that the invention may be implemented in conjunction with neuroimaging. For example, neuroimaging may be performed with the advertising or marketing materials and a keypress or similar procedure may be implemented at relatively the same time or a later time. For example, if the keypress procedure is done outside of the neuroimaging, it may be used as a covariate in data analysis of the brain imaging data. Furthermore, the results of keypress procedure and the neuroimaging may be combined to increase the interpretive power of the process. Furthermore, if an optimal response is not obtained, then the process can be done iteratively.

It should be understood, as described above, moreover, that other procedures may be implemented in place of the keypress procedure. For example, the measure of preference in terms of keypress or time is not the only measure by which response data may be sampled. Response data, for instance, may be sampled by an individual keypres sing for units of money or points that allow approach or avoidance. The units that demarcate relative preference do not have to be keypress or time, but could be any medium by which trades are made between potential goal-objects, e.g., gold, food-items, paper money, time, ratings, etc. As described above, it is also possible to transform existing frequency data so that it can be analyzed as described herein. For example, pre-existing movie rating data along a scale of 1-5 may be transformed an approach and avoidance scale as follows:

| Rank | Response Data |
|---|---|
| 1 | −2 |
| 2 | −1 |
| 3 | 0 |
| 4 | +1 |
| 5 | +2 |

In this way, existing frequency data may be mapped into response data. In an embodiment, the response data may include more than approach and avoid actions.

Furthermore, the evaluation items or stimuli that are used for mapping the preference space of an individual for marketing or advertising purposes need not be just stimuli related to the actual marketing or advertising materials, but could be stimuli of more general interest, such as photographs of sports, nature, activities, hobbies, and other general categories.

In addition, the present invention may be used to evaluate how relative preference data may be altered over time by relative deficit states or degrees of satiation, such as relative preferences for food before and after a hunger deficit state. In this case, the evaluation items or stimuli may include both normal colored food items and discolored food items to make them unappetizing. Other evaluation items or stimuli may include food items that are prepared and ready to eat and items that are unprepared or raw. The participants may be in one of two possible states during the keypress procedure: after an 18 hour fast, such as before the participant eats lunch, and after consuming a normal lunch. Such evaluations may point to how the temporal delivery of marketing communications can be salient—some messages will induce a greater preference response just before normal meal times than at other times. The present invention may provide a quantification of the differences in preference produced by these timing and stimulus alterations.

Additional Applications

It should be understood that the invention may be applied to many fields of endeavor. The following describes several exemplary applications of the present invention, but is not intended to be exhaustive. In general, applications of the invention include (a) marketing and advertising, (b) relative preference prediction to facilitate consumption based on recommendations made by product provider, (c) optimization of search engine functions by filtering of search results to an audience preference map, (d) product optimization and packaging for a target audience, (e) human resources, and (f) match-making, among others. For advising consumption, the invention may have direct implications for increasing consumption by making recommendations to consumers, such as book or movie recommendations. For optimization of search engine results, the invention may have implications for the optimal placement of advertisements for viewing by search engine users. For human resources as well as matching personnel to specific tasks, the invention may be applied by organizations in which a high school, college or graduate student enters the organization with a particular career path in mind, but may have an aptitude or preference for tasks or activities of the organization that are different. For matchmaking applications, the invention may be used to identify compatible individuals.

Movies or Literature

To evaluate movies, for example, participants or customers may be asked to complete a keypress task on the Internet. The response data may be processed as described herein to create a "preference vector" for the participant or customer in order to guide further recommendations for movies or books. The keypress procedure may be designed as an overt task, i.e., with no subliminal stimuli, and have five or more categories of stimuli conditions. One stimuli condition may be picture stills from 20 different horror movies. A second condition may be 20 picture stills from romantic movies, a third condition may be 20 picture stills from adventure and/or action movies, a fourth condition may be 20 picture stills from comedies, a fifth condition may be 20 picture stills from mysteries, a sixth condition may be 20 picture stills from historical movies and/or documentaries, etc. In the context of literature, the experimental conditions may represent different genres of writing and the items in each experimental condition may include brief sections of text or auditory recordings or readings. These pictures or other stimuli could be presented over the Internet, e.g., from a web site, to the participant or customer, and the keypress response data collected regarding approach, avoidance, non-action about, or variable approach and avoidance of the evaluation items. The response data may be analyzed as described herein to assess the relative ordering of preferences across movie categories or literature genres on the trade-off plot(s), and assessed for which categories had the highest standard deviations, and thus represented "hard decisions" using the saturation plot, along with which relative orderings were consistent between approach vs. avoidance using the value function plot(s), and thus had the least inconsistency associated with decisions for or against them.

The relative preference data then may be compared to ratings a customer made over time for various categories of movies or books to identify the extent to which "local context effects" may influence the customer's ratings. Local context effects may include the proximity of one category of movie or book to another in their release or publication, or the critical reviews of particular movies or books, or the day of the week the movie or book was watched/read, or local events of salience. It is also salient that other factors besides movie or book category might be relevant to a customer's keypress responses, such as the Director of the movie, leading actor or actress, or author of the book.

Security

Behavioral tasks to assess unconscious hostility toward an organization such as a company, government or governmental entity, and sympathy toward violent extremism/fanaticism/intolerance may be implemented with the present invention in a number of ways. For example, a keypress procedure with ideologically biased pictures, e.g., pictures presenting actions supporting a government's interests or against a government's interests may be created or defined. This may be done either with subliminal pictures, e.g., pictures presented fast enough that the viewer does not gain conscious recognition of what is observed, or with overt pictures, e.g., consciously observed pictures.

In the subliminal task, two sets of subliminal stimulus conditions may be used. One security-based option or stimulus condition may include pictures showing events from a pro-terrorist and anti-government perspective. Another security-based option or stimulus condition may include pictures that showed events from an anti-terrorist and pro-government perspective. Both sets of subliminal stimuli may be presented before mildly positive or mildly aversive neutral pictures. The method by which the subliminal stimuli are made to be outside of the participant's conscious awareness may involve a number of techniques, such as the use of a "forward mask" and a "backward mask" that effectively sandwich the very brief subliminal stimulus and act as distracting stimuli. It should be understood that the use of masks reduces the chance that a participant may consciously perceive the subliminal stimulus. Nonetheless, a keypress procedure for security-based option may be created without masks and/or without subliminal stimuli.

For example, if ten pictures are used for each category of subliminal stimulus, then a participant could complete the test session in a relatively short time frame of approximately 20*8 seconds (assuming the default time of the exemplar keypress task explained for marketing)=160 seconds. The results of this keypress task then may be mapped into the relative preference space defined by (i) preference trade-off graphs, (ii) preference saturation graphs, and (iii) value functions of preference intensity against preference uncertainty. These graphs may be compared and contrasted for preference for or against violent action toward the subject government and its citizens. Findings of (a) active hostility toward the subject government, and (b) sympathy to extremist ideology could be integrated into an algorithm to assess violent intention (IA), and incorporate other potential risks for violent behavior, such as data from demographics, prior history, and known associates, to produce an index for response by governmental authorities.

This application may be employed at one or more points of entry into the territory of the subject government, at its Embassies and/or consulates overseas, at airports, ports and other legal border crossing points, and at immigration detention sites.

Figure 22:
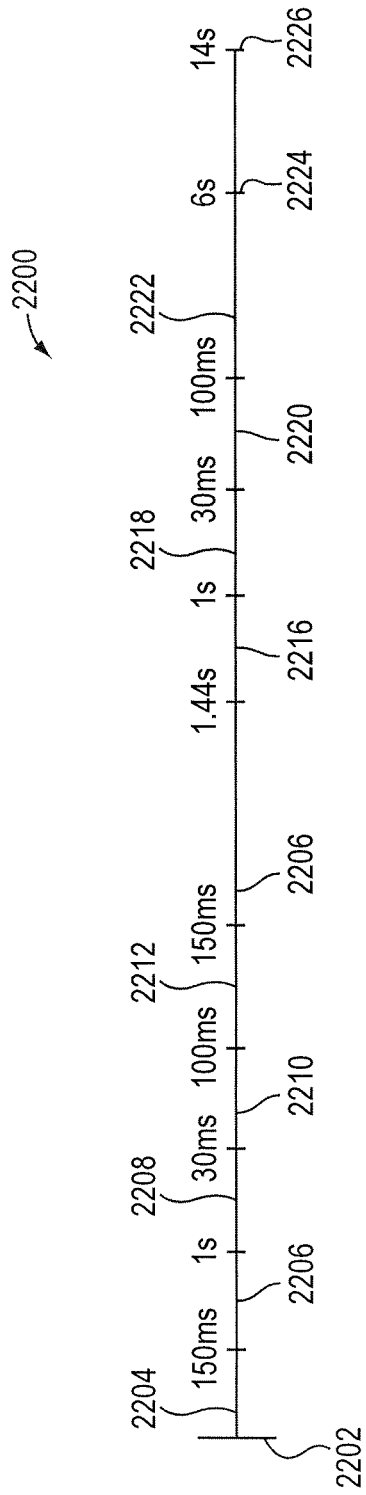

FIG. 22 is a timeline 2200 of an embodiment of a keypress procedure for use in a security-based application of the present invention. The keypress procedure for a security-based application may include a series of tasks in which both a subliminal stimulus and a corresponding overt evaluation item are presented to the participant during the course of each keypress task. The subliminal stimulus is presented to the participant for so short a time that the participant is not consciously aware of the subliminal stimulus. The overt evaluation item is presented to the participant for a long enough period of time for the participant to be consciously aware of it. However, as described herein, the keypress procedure is designed so that the participant's behavior regarding the subliminal stimulus is reflected in his or her keypress activity for the overt evaluation item. That is, the keypress activity entered during the presentation of the overt evaluation item is a function of the participant's approach or avoidance regarding the subliminal stimulus.

In an embodiment, the security-based keypress procedure includes three experimental conditions: (i) positive and pro-government images; (ii) neutral objects or scenes; and (iii) negative and anti-government images. Items (i) and (iii), which are the subliminal stimuli, may have extreme intensity ratings with a positive valence for (i) and a negative valence for (iii) when rated by participants who strongly favor the government, e.g., are patriotic. For the positive and pro-government subliminal stimuli, the corresponding overt evaluation items may have mild positive intensity ratings and the corresponding overt evaluation items may have mild negative intensity ratings. Suitable images for use as the overt evaluation items may be bland pictures of objects or rooms.

The portion of the keypress procedure associated with each subliminal stimulus, e.g., each pro-government or anti-government photograph or video clip, has a start time 2202. In a first fixation period 2204, a blank screen with a central fixation point in the form of a cross, asterisk, or other character, is presented to the participant in the viewing area 402 (FIG. 4) as a transition between the prior subliminal stimulus and the current subliminal stimulus. The first fixation period 2204 may last approximately 150 milliseconds (ms). The first fixation period 2204 may be followed by a first forward mask period 2206 during which a forward mask image is presented to the participant in the viewing area 402 of the screen 400. The first forward mask period may last approximately 1.0 seconds (s). In an embodiment, a forward mask image is a mosaic of image snippets from some or all of the overt plus covert evaluation items corresponding to the current security-based option. The image snippets may be arranged in a checkerboard fashion with each snippet located in a square of the checkerboard to create the mosaic. Each image snippet may be small enough and the snippets scrambled so that the forward mask image does not have any recognizable images or patterns to the participant.

The first forward mask period 2206 may be followed by a first subliminal or covert stimulus period 2208 during which the subliminal stimulus is presented to the participant on viewing area 402. The first subliminal stimulus period 2208 may last for 30 ms. Following the first subliminal stimulus period 2208 may be a first backward mask period 2210 during which a backward mask image is presented to the participant on the viewing area 402. The first backward mask period 2210 may last for approximately 100 ms. In an embodiment, a backward mask image is also a mosaic of image snippets from some or all of the overt plus covert evaluation items corresponding to the current security-based option. As with the forward mask image, the image snippets for the backward mask image may be arranged in a checkerboard fashion with each snippet located in a square of the checkerboard to create the mosaic. Each image snippet may be small enough and the snippets scrambled so that the backward mask image does not have any recognizable images or patterns to the participant. In an embodiment, the backward mask image is different from the forward mask image.

Following the first backward mask period 2210 may be a first overt evaluation period 2212 during which the overt evaluation item that has been associated with the current subliminal stimulus is presented to the participant in the viewing area 402. The first overt evaluation period 2212 may last for 150 ms. Following the first overt evaluation item period 2212 may be a second fixation period 2214 in which the viewing area 402 is again blank with a central fixation point in the form of a cross or asterisk. The second fixation period 2214 may last approximately 1.44 seconds. Following the second fixation period 2214 may be a second forward mask period 2216 in which the same forward mask image or a new forward mask image is presented to the participant in the viewing area 402. The second forward mask period 2216 also may last approximately 1.0 second. The second forward mask period 2216 may be followed by a second subliminal stimulus period 2218 during which the subliminal stimulus is again presented to the participant in viewing area 402. The second subliminal stimulus period 2218 also may last for 30 ms. Following the second subliminal stimulus period 2218 may be a second backward mask period 2220 during with the same backward mask image or a new backward mask image is presented to the participant in the viewing area 402. The second backward mask period 2220 also may last for approximately 100 ms. Following the second backward mask period 2220 may be a second overt evaluation item period 2222. The second overt evaluation item period 2222 may last for a default time 2224, e.g., approximately six seconds, if the participant takes no action.

As described above, the participant can act to either lengthen or shorten the time that the second overt evaluation item remains displayed in the viewing area 402. As mentioned above, if the participant takes no action, the overt evaluation item is removed or stopped at the default time 2224, which again may be six seconds, and the keypress procedure proceeds to the next subliminal stimulus/over evaluation item pair. If the participant finds the overt evaluation item to be desirable or appealing, which behavior will be a function of the subliminal stimulus, the participant may lengthen the time by which it remains displayed past the default time 2224 by alternatingly pressing the approach keys. By continuing to toggle between the approach keys, the participant can cause the overt evaluation item to continue to be displayed up to a maximum time 2226, e.g., fourteen seconds, thereby signaling both a preference toward the current evaluation item, i.e., the subliminal stimulus, and the intensity of the participant's preference toward the current evaluation item, i.e., the subliminal stimulus.

If the participant dislikes the overt evaluation item, the participant may shorten the time by which it is displayed by alternatingly pressing the avoidance keys. By continuing to toggle between the two avoidance keys, the participant can stop the display of the current evaluation item sooner than the default time 2224, thereby signaling both a dislike of the current evaluation item, i.e., the subliminal stimulus, and the intensity of the participant's dislike toward the current evaluation item, i.e., the subliminal stimulus.

It should be understood that variations to the security-based keypress procedure may be made, such as changing one or more time periods, re-arranging the order, adding new experimental steps in a keypress task, and/or removing steps in the experimental task.

Internet Search Engine/Preference Vector

Behavioral tasks to assess preferences toward categories of material, such as materials used in web-based searches with a search-engine, may be readily implemented with the present invention. This information may also be used to better target advertisements to search-engine users.

Specifically, an organization could ask a customer to complete a keypress task on the web, whose data is then used as a "preference vector" to filter the output of web searches. For example, individual may complete a keypress procedure or task with 20 distinct experimental conditions. These experimental conditions may include the following: (1) technology, (2) religion, (3) psychology/behavior/self-help, (4) cooking/home-economics, (5) weaving/sewing/fashion, (6) animals/pets, (7) sports, (8) history/war, (9) literature, (10) art/sculpture, (11) science/math, (12) fishing/hunting/outdoors/guns, (13) cars/boating, (14) home improvement/architecture, (15) gardening/plants, (16) music, (17) economics/business, (18) politics/government, (19) law enforcement/legal history, (20) movies/entertainment/pornography. From this keypress task, the individual's trade-off graph, value function, and saturation function are produced, and they may show, for example, a clear high preference for music, above home-improvement or gardening, and above law-enforcement. This same person then may submit an Internet search using a search engine with the word "pick". The word "pick" could also have been a phrase, or set of words. In the case of the word "pick" it has meanings related to "guitar pick", "pick-ax", "pick a lock", "choose an item", or "mistreat someone". By utilizing the individual's preference vector, the search engine may determine that there is a higher probability that the reference from this particular individual was likely to be to a "guitar pick", than "pick-ax" (for home improvement or for gardening) or "pick a lock" and "mistreat someone" (for law enforcement/ legal issues).

In addition, the above-described preference mapping may be used by the Internet search engine to focus the type of advertisements that are displayed to the individual along with the search results. The above-described preference mapping may also be used to select one or more additional keypress procedures or tasks to generate more fine-tuned and specific topics and issues of interest to the individual.

Production Optimization and Packaging

Behavioral tasks to assess preferences toward variants of products, or new products, may also be performed with the present invention. For example, a "keypress" procedure may be defined in which an individual browses music. Here, the individual may scroll through the music, rather than keypress. For example, the individual may have a set amount of time in which to listen to a song. The individual may end his or her listening to a current snippet of a song with one command, or extend his or her listening with another command once they have come to the end of the current music snippet. The individual also may be able to extend his or her listening over the entire song. The collected response data relates to the total time that the individual listened to the song given. Based on this response data, positive value function and saturation plots across a number of different categories of music, or across distinct bands/performers may be generated. In addition a mean time may be used alternately to put together a trade-off graph, a positive and negative value function and a saturation function. From this relative preference mapping, the system and/or an evaluator may determine the types of music the individual prefers, and thus make better recommendations.

Similarly, a set of variants of new music that a band is producing may be placed on a website. Based on the response data generated by many people and the organization of those people based on demographic information, relative preference data may be used to package specific sets of song versions for a new album, and to target the specific compilations of song variants to specific consumer groups.

This same approach also may be used for competitions between bands, or to determine where musical tastes are moving in particular parts of a country or specific target consumers.

A similar application may be implemented to select packaging for a product that is different than music, such as T-shirts, fashion items, etc.

Human Resources

The system and method of the present invention may be used to assess issues relating to the needs of a specific organization, such as a business. For example, a shipping business may need individuals for monitoring sonar, planning the course for a freight boat, determining what crew are needed, matching the freight needed at a site to what is available for shipping at the port of origin, etc. Based on a keypress procedure or task that assesses experimental conditions targeting these topics, job applicants may be more optimally placed with the job for which they have the highest interest.

Alternately, a keypress procedure or task may be created or defined to assess how a job applicant responds to issues of relevance for a service company, or how best a service company might allocate its existing work force. For example, cleanliness and how employees respond to having an organized and well-maintained work environment may be important to a particular organization or business, such as a food service company. A keypress procedure or task may be used to assess how relevant cleanliness is to a prospective employee or an existing member of the organization's staff.

Alternately, a detailed keypress procedure or task relating to interests in engineering may be used in order to best select a team for a particular contract within a technology firm.

Alternately, a keypress procedure task may be defined or created that involves experimental conditions for many of the types of tasks a military organization, such as an army, needs in the field of deployment, so as to fit recruits to a needed work function.

Match-Making

For match-making, finding a match between two people may be improved by looking for matches between two preference mappings as described above in connection with the Internet Search Engine/Preference Vector. Mapping an individual's preference space to create a trade-off plot, value function, and saturation function over some set of experimental conditions may be referred to as a "preference map". The relative ordering of preferences and their intensity (as from a value function) may be referred to as a "preference vector". For match-making, the preference vectors of various individuals may be compared to find optimal matches by considering components of the preference maps of different people, in a step-wise manner. For example, a keypress procedure or task may start with high-level, e.g., global experimental conditions, and then use ever more selective sets of mappings that go into greater detail about the likes, wants, social, cultural, and intimacy issues of participants to fine-tune matches between people.

The foregoing description has been directed to specific embodiments of the present invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method of analyzing preferences of one or more participants, the method comprising:
    presenting to the one or more participants a plurality of evaluation items, where a first set of the evaluation items illustrates a first marketing option, and a second set of the evaluation items illustrates a second marketing option that is different from the first marketing option, and the first and second sets are non-overlapping;
    obtaining response data from the one or more participants where the response data is indicative of at least an approach toward the plurality of evaluation items by the one or more participants;
    storing the obtained response data in a memory;
    computing, by a processor coupled to the memory, relative approach probabilities for the plurality of evaluation items based on the obtained response data;
    generating, by the processor, for the one or more participants approach entropy values for the first and second marketing options, where the approach entropy values are generated by applying a sum function to the computed relative approach probabilities; and
    determining for the one or more participants a relative preference order between the first and second marketing options based on the generated approach entropy values for the first and second marketing options.

2. The method of claim 1 where the first and second marketing options constitute products, services, product packaging, advertising material, or marketing material.

3. The method of claim 1 where the response data is further indicative of an avoidance from the plurality of evaluation items.

4. The method of claim 3 further comprising, for the one or more participants, generating avoid entropy values based on the response data for the first and second marketing options.

5. The method of claim 4 further comprising displaying on a display screen a value function plot of the approach entropy values and the avoid entropy values for the first and second marketing options as a function of approach response data and avoid response data, respectively, for the one or more participants.

6. The method of claim 5 further comprising:
determining, by the processor, for the one or more participants a relative ordering between the first and second marketing options based on the value function plot.

7. The method of claim 1 wherein the plurality of evaluation items is presented to the one or more participants over a data communication network.

8. The method of claim 1 wherein the plurality of evaluation items are photographs or video clips.

9. The method of claim 1 wherein the response data is obtained through at least one of:
a keypress procedure;
a lever press procedure;
a potentiometer procedure;
an on/off switch procedure;
a spending procedure; and
a transformation of rating data.

10. The method of claim 1 wherein
the first and second marketing options constitute music, and
the plurality of evaluation items are songs or portions of songs.

11. A non-transitory computer-readable medium comprising instructions executable by one or more data processing entities, the medium comprising:
instructions to present to one or more participants a plurality of evaluation items, where a first set of the evaluation items illustrates a first marketing option, and a second set of the evaluation items illustrates a second marketing option that is different from the first marketing option, and the first and second sets are non-overlapping;
instructions to obtain response data from the one or more participants where the response data is indicative of an approach toward each of the evaluation items by the one or more participants and an avoidance of each of the evaluation items by the one or more participants;
instructions to compute, by a processor, relative approach probabilities and relative avoidance probabilities for the plurality of evaluation items based on the response data;
instructions to generate for the one or more participants an approach entropy value for the first and second marketing options, where the approach entropy value is generated by applying a sum function to the computed relative approach probabilities;
instructions to generate for the at least one participants an avoid entropy value for the first and second marketing options, where the avoid entropy value is generated by applying a sum function to the computed relative avoidance probabilities; and
instructions to display a plot of the approach entropy values for the first and second marketing options as a function of the avoid entropy values for the first and second marketing options.

12. The non-transitory computer-readable medium of claim 11 wherein the response data is obtained through at least one of:
a keypress procedure;
a lever press procedure;
a potentiometer procedure;
an on/off switch procedure;
a spending procedure; and
a transformation of rating data.

13. The non-transitory computer-readable medium of claim 11 wherein
the first and second marketing options constitute products, services, product packaging, advertising material, marketing material or music, and
the plurality of evaluation items are one or more of photographs, video clips, songs, and portions of songs.

14. A method of analyzing preferences of one or more participants, the method comprising:
presenting to each of the one or more participants a plurality of evaluation items, where a first set of the evaluation items illustrates a first marketing option, and a second set of the evaluation items illustrates a second marketing option that is different from the first marketing option, and the first and second sets are non-overlapping;
obtaining response data from each of the one or more participants where the response data is indicative of at least an approach toward each of the plurality of evaluation items by the one or more participants;
storing the response data in a memory;
generating, by processor coupled to the memory, for each of the at least one participants an approach standard deviation value for the first and second marketing options, where the approach standard deviation value is generated by applying a sum function to the response data;
displaying on a screen coupled to the processor a saturation plot of the approach standard deviation values for the first and second marketing options as a function of the response data indicative of at least the approach toward the evaluation items; and
determining based on the saturation plot an indication of difficulty by the one or more participants in approaching the first and second marketing options.

15. An apparatus comprising:
a memory; and
a processor coupled to the memory, the processor configured to:
present to a plurality of participants sets of evaluation items, where each set of evaluation items illustrates a marketing option;
obtain response data from the plurality of participants where the response data is indicative of an approach toward and an avoidance from the evaluation items in the sets;
store the obtained response data in the memory;
compute, for the plurality of participants, based on the obtained response data relative approach probabilities and relative avoidance probabilities for the evaluation items in the sets;
generate, for the plurality of participants, approach entropy values and avoid entropy values for the marketing options, where the approach entropy values are generated by applying a sum function to the computed relative approach probabilities, and the avoid entropy values are generated by applying a sum function to the computed avoidance probabilities; and determine, for the plurality of participants, relative preference orders among the marketing options based on the approach entropy values and the avoid entropy values.

16. The apparatus of claim 15 wherein the processor is further configured to:

determine at least one of a number and a percentage of the plurality of participants having the same relative preference order among the marketing options.

17. The apparatus of claim 15 wherein the response data is obtained through at least one of:

a keypress procedure;
a lever press procedure;
a potentiometer procedure;
an on/off switch procedure;
a spending procedure; and
a transformation of rating data.

18. The apparatus of claim 15 wherein the processor is further configured to:

generate a value function plot of the approach entropy values and the avoid entropy values for the plurality of marketing options as a function of approach response data and avoidance response data.

19. The apparatus of claim 18 wherein the processor is further configured to:

determine, for the plurality of participants, relative orderings among the marketing options based on the value function plot.

20. The apparatus of claim 18 wherein the approach response data and the avoidance response data are obtained through a keypress procedure, the processor further configured to:

determine mean approach keypresses for the approach entropy values;
use the mean approach keypresses as the approach response data of the value function plot;
determine mean avoid keypresses for the avoid entropy values;
use the mean avoid keypresses as the avoidance response data of the value function plot; and
determine, for the plurality of participants, relative orderings among the marketing options based on the value function plot.

21. The apparatus of claim 15 wherein the first and second marketing options constitute products, services, product packaging, advertising material, marketing material or music, and
the plurality of evaluation items are one or more of photographs, video clips, songs and portions of songs.

* * * * *

UNITED STATES PATENT AND TRADEMARK OFFICE
CERTIFICATE OF CORRECTION

| | | |
|---|---|---|
| PATENT NO. | : 8,620,721 B1 | Page 1 of 1 |
| APPLICATION NO. | : 13/584155 | |
| DATED | : December 31, 2013 | |
| INVENTOR(S) | : Hans C. Breiter | |

It is certified that error appears in the above-identified patent and that said Letters Patent is hereby corrected as shown below:

In the Specification:
Col. 11, line 25:
~~is where,~~ should read
where,

Col. 23, line 67:
~~may be sampled by an individual keypres sing for units of~~ should read
may be sampled by an individual keypressing for units of Signed and Sealed this
Thirteenth Day of May, 2014

Michelle K. Lee
*Deputy Director of the United States Patent and Trademark Office*